US010386564B2

(12) United States Patent
Ohkawa

(10) Patent No.: US 10,386,564 B2
(45) Date of Patent: Aug. 20, 2019

(54) LIGHT EMITTING DEVICE, DISPLAY UNIT, AND ILLUMINATION UNIT

(71) Applicant: SONY CORPORATION, Tokyo (JP)

(72) Inventor: Shingo Ohkawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 15/532,901

(22) PCT Filed: Oct. 27, 2015

(86) PCT No.: PCT/JP2015/080190
§ 371 (c)(1),
(2) Date: Jun. 2, 2017

(87) PCT Pub. No.: WO2016/098454
PCT Pub. Date: Jun. 23, 2016

(65) Prior Publication Data
US 2017/0343724 A1    Nov. 30, 2017

(30) Foreign Application Priority Data

Dec. 16, 2014    (JP) .................................. 2014-253646

(51) Int. Cl.
*F21V 7/04*    (2006.01)
*F21V 8/00*    (2006.01)
(Continued)

(52) U.S. Cl.
CPC .............. *G02B 6/0038* (2013.01); *F21S 2/00* (2013.01); *G02B 6/005* (2013.01); *G02B 6/0053* (2013.01);
(Continued)

(58) Field of Classification Search
CPC .... G02B 6/0038; G02B 6/005; G02B 6/0053; G02B 6/0055; G02B 6/0068; G02B 6/0015; G02B 6/0016; G02B 6/0061; F21S 2/00
(Continued)

(56) References Cited

U.S. PATENT DOCUMENTS 8,120,726 B2    2/2012 Suzuki
2007/0263412 A1*  11/2007 Lee .................... G02B 6/0051
362/626
(Continued)

FOREIGN PATENT DOCUMENTS

CN    102066836 A    5/2011
CN    104267458 A    1/2015
(Continued)

OTHER PUBLICATIONS

International Search Report and Written Opinion of PCT Application No. PCT/JP2015/080190, dated Dec. 28, 2015, 02 pages of English Translation and 09 pages of ISRWO.

*Primary Examiner* — Matthew J. Peerce
(74) *Attorney, Agent, or Firm* — Chip Law Group

(57) ABSTRACT

A light emitting device of the disclosure includes a first light source and a second light source. A light-guiding plate having a first main surface and a second main surface that face each other, a first end surface facing the first light source, and a second end surface facing the first end surface and the second light source. The light-guiding plate includes a plurality of first slope sections and a plurality of second slope sections both provided on one of the first main surface and the second main surface, in which the plurality of first slope sections are provided to allow the light-guiding plate to be thinner in a first direction, and the plurality of second slope sections are provided to allow the light-guiding plate to be thicker in the first direction.

19 Claims, 26 Drawing Sheets

(51) Int. Cl.
*F21S 2/00* (2016.01)
*G02F 1/1335* (2006.01)

(52) U.S. Cl.
CPC ......... *G02B 6/0055* (2013.01); *G02B 6/0068* (2013.01); *G02F 1/133615* (2013.01)

(58) Field of Classification Search
USPC ....................................................... 362/606
See application file for complete search history.

(56) References Cited

U.S. PATENT DOCUMENTS

| | | | | |
|---|---|---|---|---|
| 2011/0109533 A1* | 5/2011 | Suzuki | ................. | G02B 6/0038 345/84 |
| 2014/0211125 A1* | 7/2014 | Kurata | ................... | G02B 6/002 349/65 |

FOREIGN PATENT DOCUMENTS

| | | |
|---|---|---|
| EP | 2306076 A1 | 4/2011 |
| JP | 11-273438 A | 10/1999 |
| JP | 2009-277388 A | 11/2009 |
| JP | 2012-027415 A | 2/2012 |
| JP | 2012-27415 A | 2/2012 |
| JP | 2013-137388 A | 7/2013 |
| JP | 2014-056201 A | 3/2014 |
| KR | 10-2011-0021898 A | 3/2011 |
| TW | 201013117 A | 4/2010 |
| TW | 201211583 A | 3/2012 |
| WO | 2009/157352 A1 | 12/2009 |

\* cited by examiner

[FIG. 1]
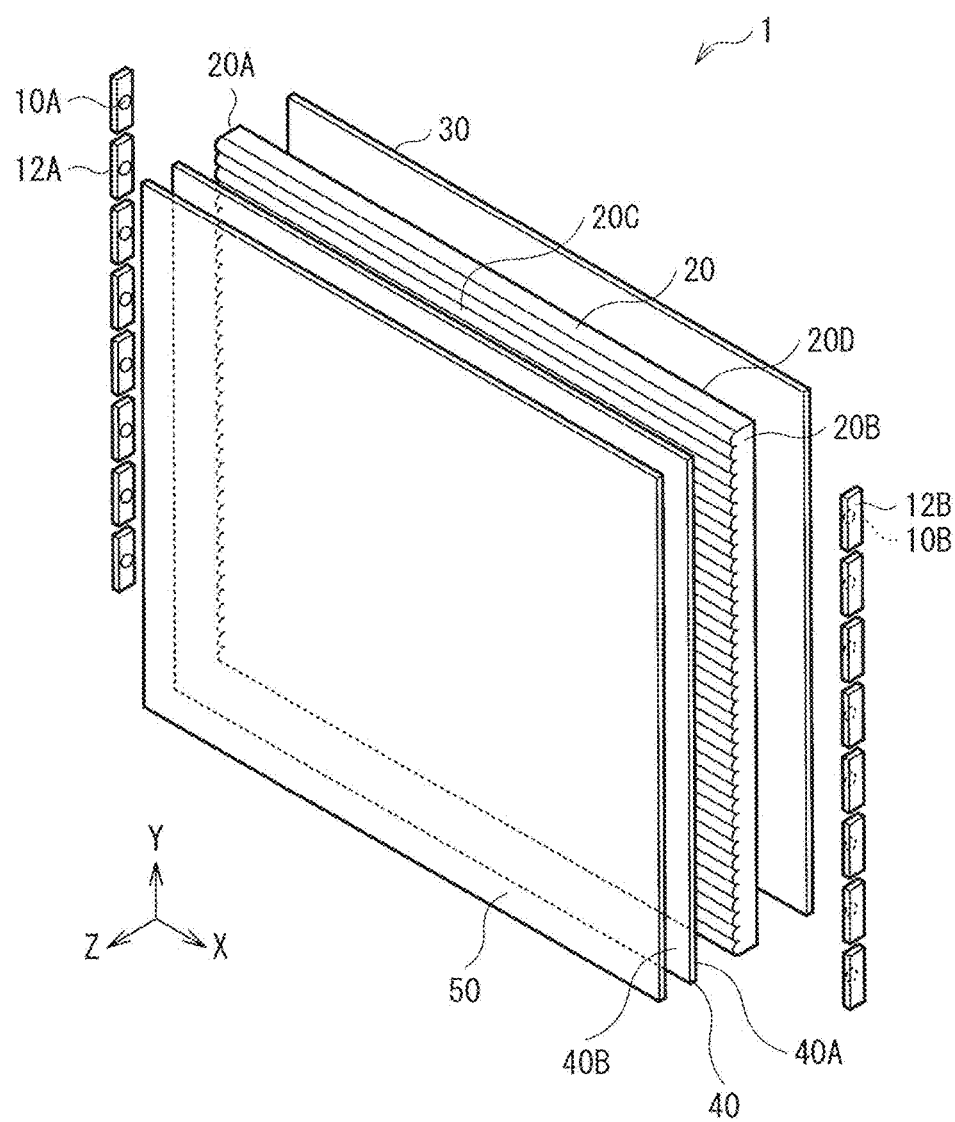

[FIG. 2]
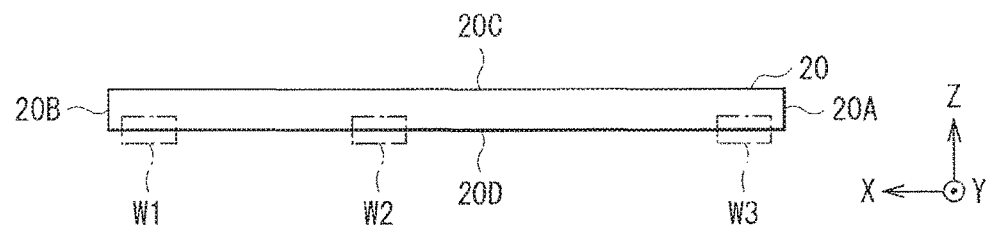
[FIG. 3A]
[FIG. 3B]
[FIG. 3C]
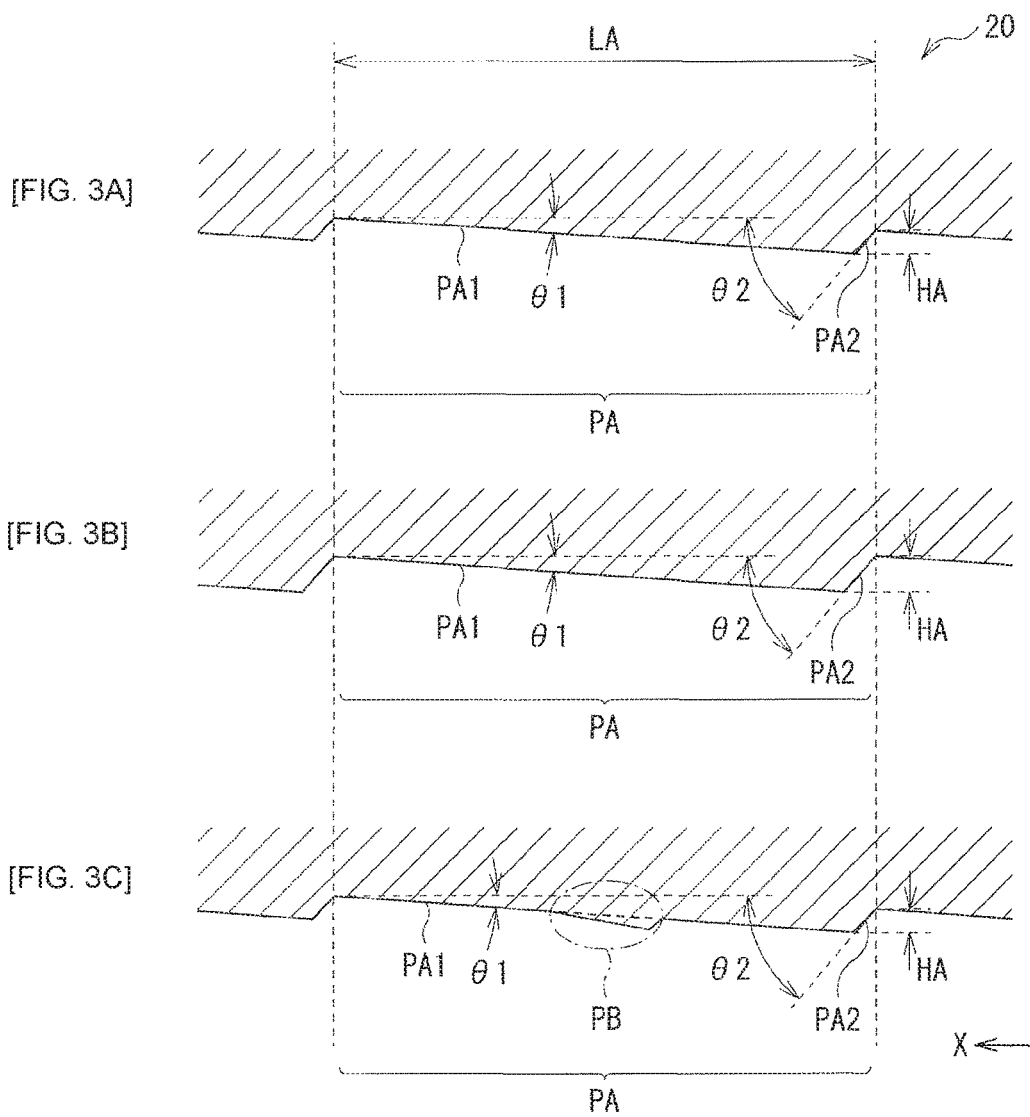

[ FIG. 4 ]
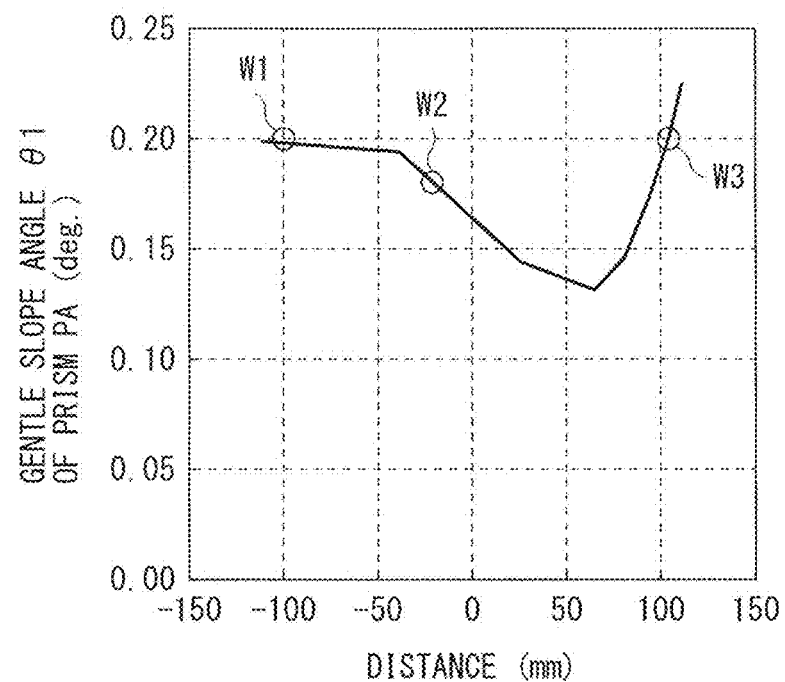
[ FIG. 5 ]
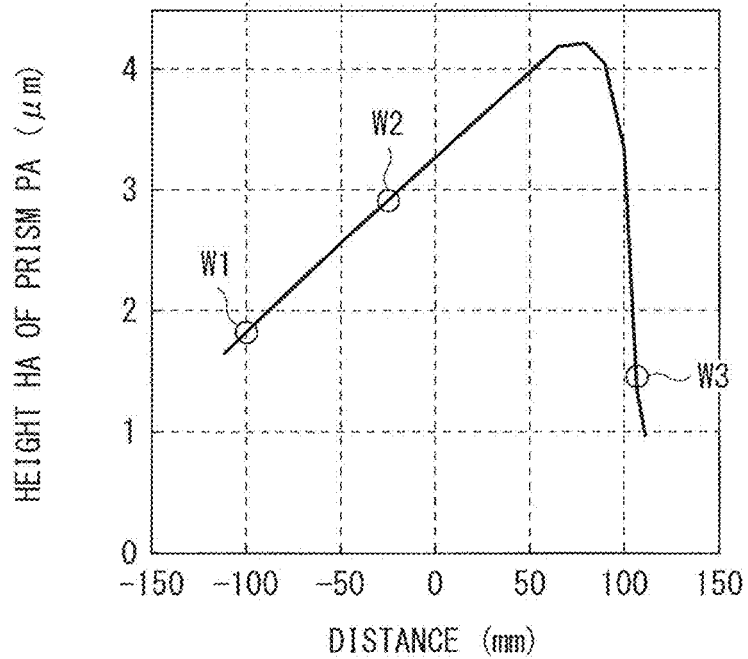

[ FIG. 6 ]
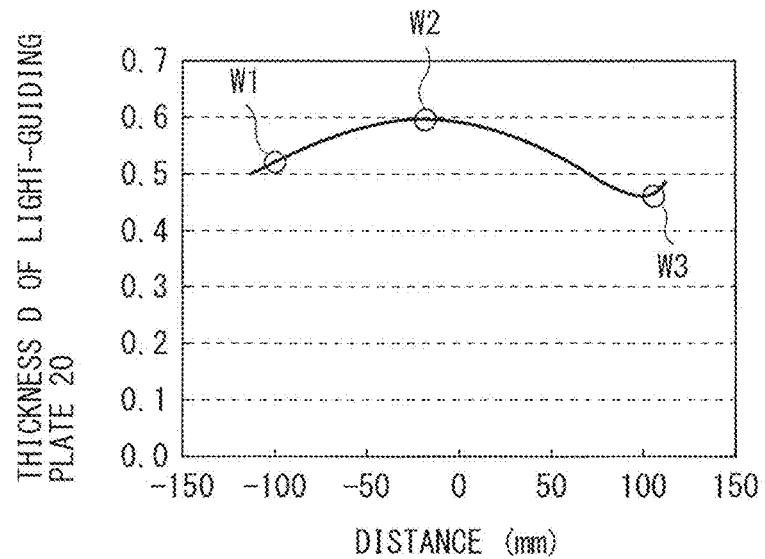
[ FIG. 7 ]
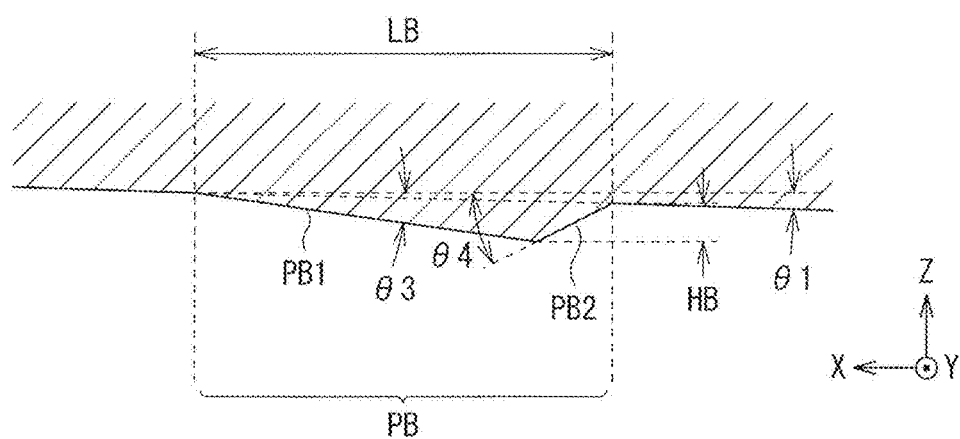

[ FIG. 8 ]
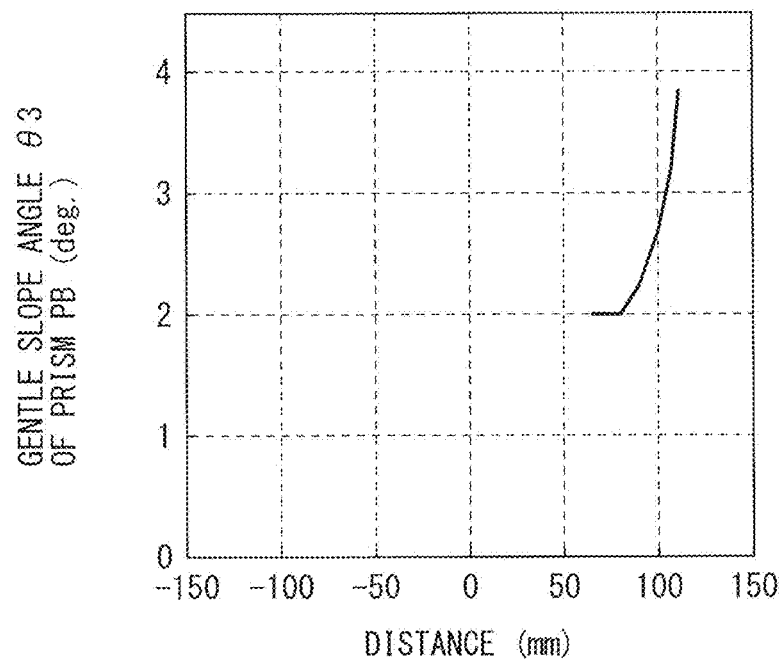
[ FIG. 9 ]
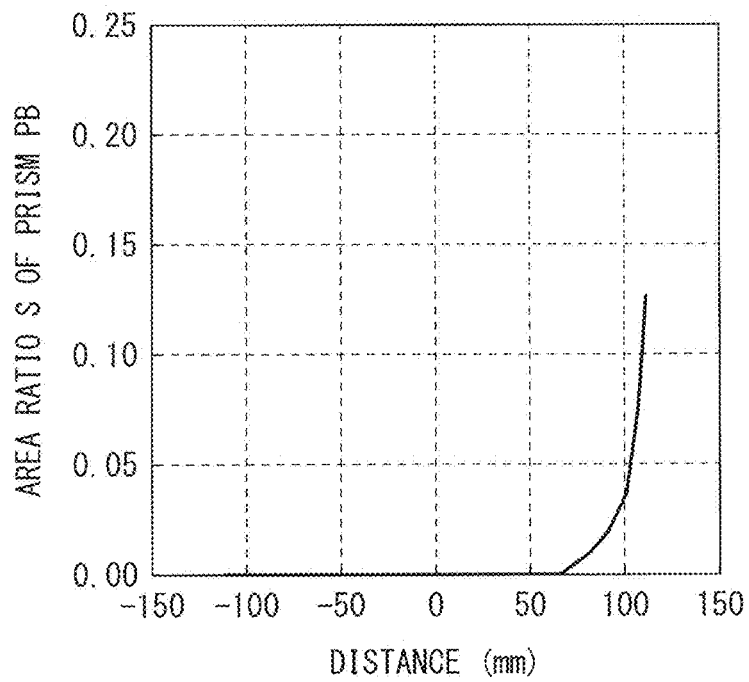

[FIG. 10]
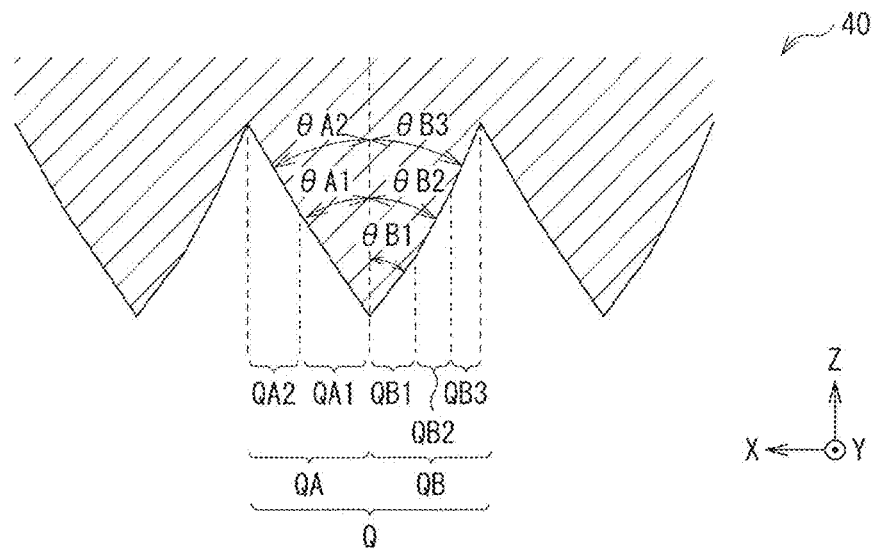
[FIG. 11]
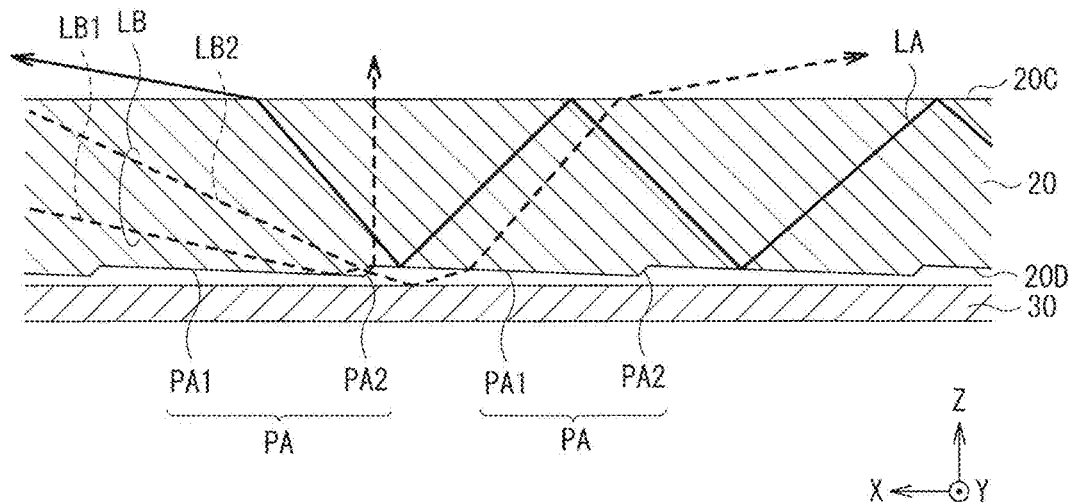

[ FIG. 12 ]
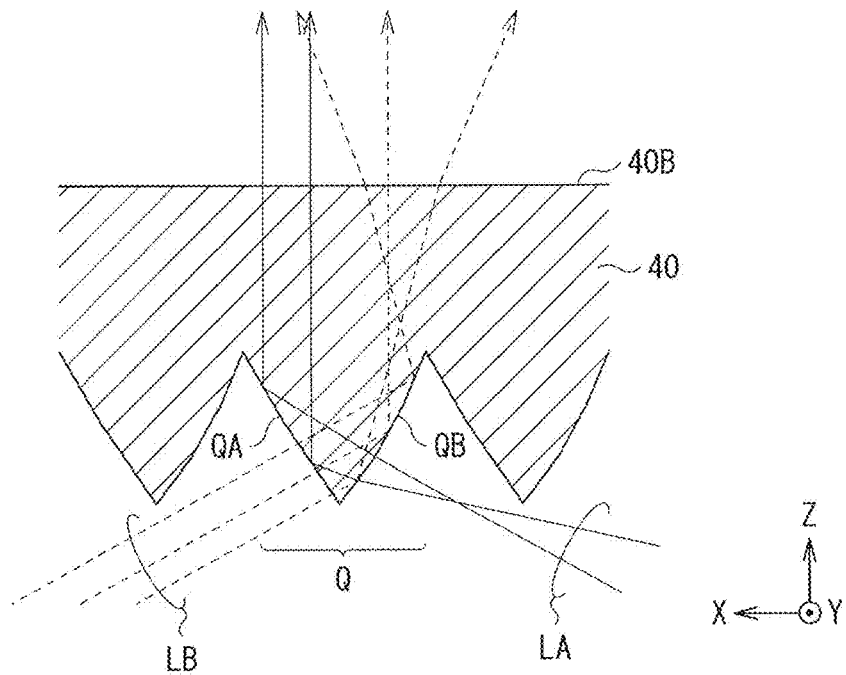
[ FIG. 13 ]
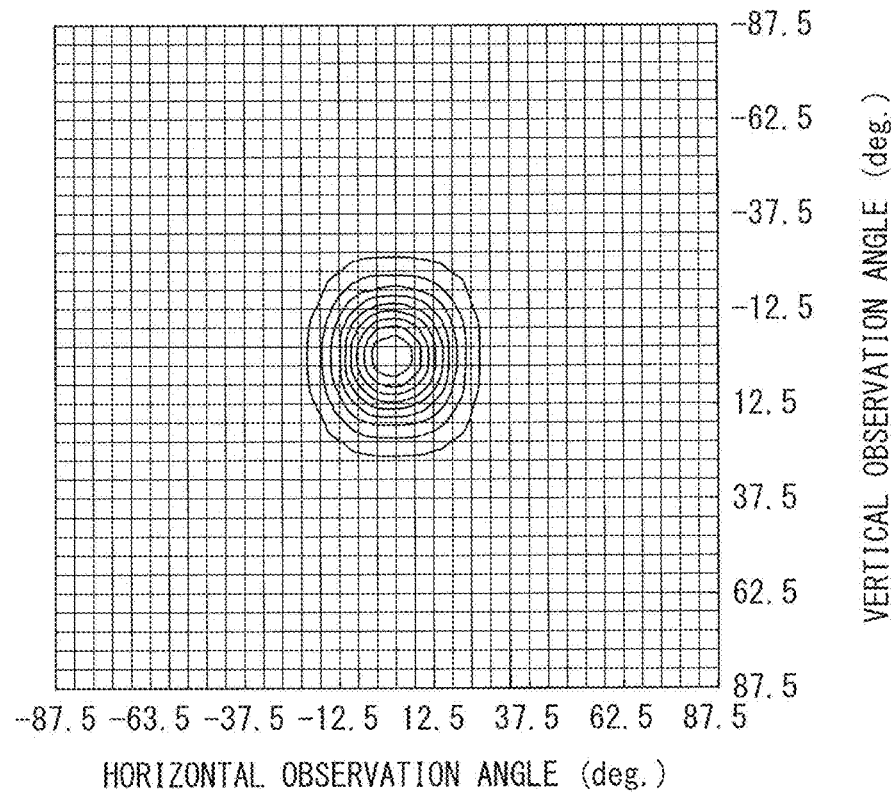

[ FIG. 14 ]
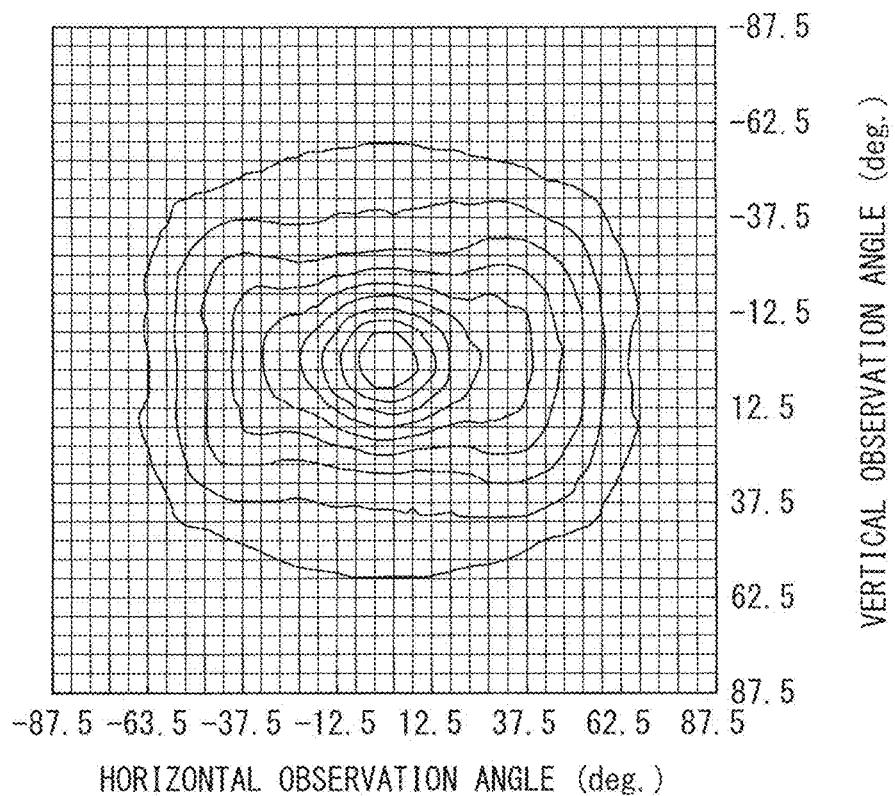
[ FIG. 15 ]
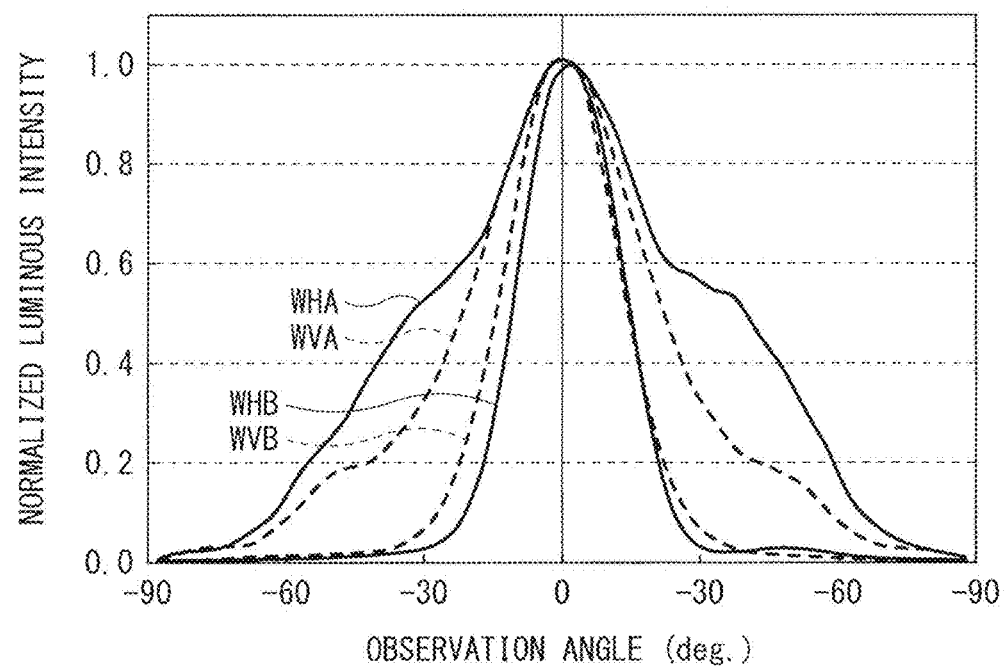

[FIG. 16]

| | LIGHT EMITTING DEVICE S0 | LIGHT EMITTING DEVICE S1 | LIGHT EMITTING DEVICE S2 | LIGHT EMITTING DEVICE S3 | LIGHT EMITTING DEVICE S4 | LIGHT EMITTING DEVICE S5 | LIGHT EMITTING DEVICE 1 |
|---|---|---|---|---|---|---|---|
| GENTLE SLOPE ANGLE $\theta_1$ OF PRISM PA | CONSTANT (0.15 DEGREES) | CONSTANT (0.15 DEGREES) | NONCONSTANT (FIG. 4) | NONCONSTANT (FIG. 4) | NONCONSTANT (FIG. 4) | NONCONSTANT (FIG. 4) | NONCONSTANT (FIG. 4) |
| STEEP SLOPE ANGLE $\theta_2$ OF PRISM PA | CONSTANT (70 DEGREES) | CONSTANT (49 DEGREES) | NONCONSTANT (49 DEGREES $-\theta_1$) | NONCONSTANT (49 DEGREES $-\theta_1$) | NONCONSTANT (49 DEGREES $-\theta_1$) | NONCONSTANT (49 DEGREES $-\theta_1$) | NONCONSTANT (49 DEGREES $-\theta_1$) |
| HEIGHT HA OF PRISM PA | CONSTANT | CONSTANT | NONCONSTANT (FIG. 5) | NONCONSTANT (FIG. 5) | NONCONSTANT (FIG. 5) | NONCONSTANT (FIG. 5) | NONCONSTANT (FIG. 5) |
| WIDTH LA OF PRISM PA | CONSTANT (0.2 mm) | CONSTANT (0.2 mm) | CONSTANT (0.2 mm) | CONSTANT (0.2 mm) | CONSTANT (0.2 mm) | CONSTANT (0.2 mm) | CONSTANT (0.2 mm) |
| THICKNESS D OF LIGHT-GUIDING PLATE 20 | CONSTANT | CONSTANT | NONCONSTANT (FIG. 6) | NONCONSTANT (FIG. 6) | NONCONSTANT (FIG. 6) | NONCONSTANT (FIG. 6) | NONCONSTANT (FIG. 6) |
| GENTLE SLOPE ANGLE $\theta_3$ OF PRISM PB | WITHOUT PRISM PB | WITHOUT PRISM PB | WITHOUT PRISM PB | NONCONSTANT (FIG. 8) | NONCONSTANT (FIG. 8) | NONCONSTANT (FIG. 8) | NONCONSTANT (FIG. 8) |
| STEEP SLOPE ANGLE $\theta_4$ OF PRISM PB | | | | NONCONSTANT (49 DEGREES $-\theta_3$) | NONCONSTANT (49 DEGREES $-\theta_3$) | NONCONSTANT (49 DEGREES $-\theta_3$) | NONCONSTANT (49 DEGREES $-\theta_3$) |
| HEIGHT HB OF PRISM PB | | | | NONCONSTANT | NONCONSTANT | NONCONSTANT | NONCONSTANT |
| WIDTH LB OF PRISM PB | | | | NONCONSTANT | NONCONSTANT | NONCONSTANT | NONCONSTANT |
| SHAPE OF LIGHT OUTGOING SURFACE OF LIGHT-GUIDING PLATE | APEX ANGLE: 120 DEGREES PITCH: 0.1 mm | APEX ANGLE: 120 DEGREES PITCH: 0.1 mm | APEX ANGLE: 120 DEGREES PITCH: 0.1 mm | APEX ANGLE: 120 DEGREES PITCH: 0.1 mm | LENTICULAR SHAPE (FIG. 1) | LENTICULAR SHAPE (FIG. 1) | LENTICULAR SHAPE (FIG. 1) |
| PRISM Q | SYMMETRY (APEX ANGLE: 68 DEGREES) | SYMMETRY (APEX ANGLE: 68 DEGREES) | SYMMETRY (APEX ANGLE: 68 DEGREES) | SYMMETRY (APEX ANGLE: 68 DEGREES) | SYMMETRY (APEX ANGLE: 68 DEGREES) | ASYMMETRY (FIG. 10) | ASYMMETRY (FIG. 10) |
| DIFFUSING SHEET 50 | WITHOUT DIFFUSING SHEET 50 | WITHOUT DIFFUSING SHEET 50 | WITHOUT DIFFUSING SHEET 50 | WITHOUT DIFFUSING SHEET 50 | WITHOUT DIFFUSING SHEET 50 | WITHOUT DIFFUSING SHEET 50 | WITH DIFFUSING SHEET 50 |

[FIG. 17]
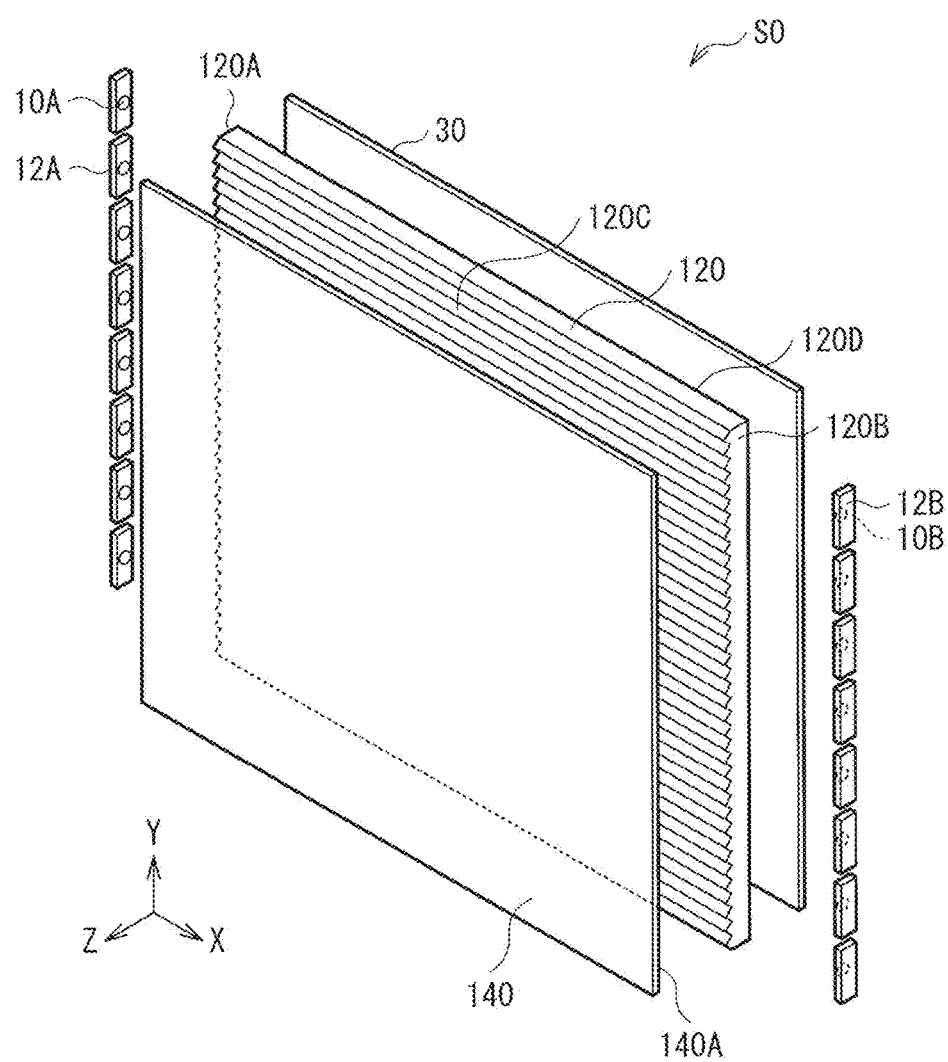

[ FIG. 18 ]
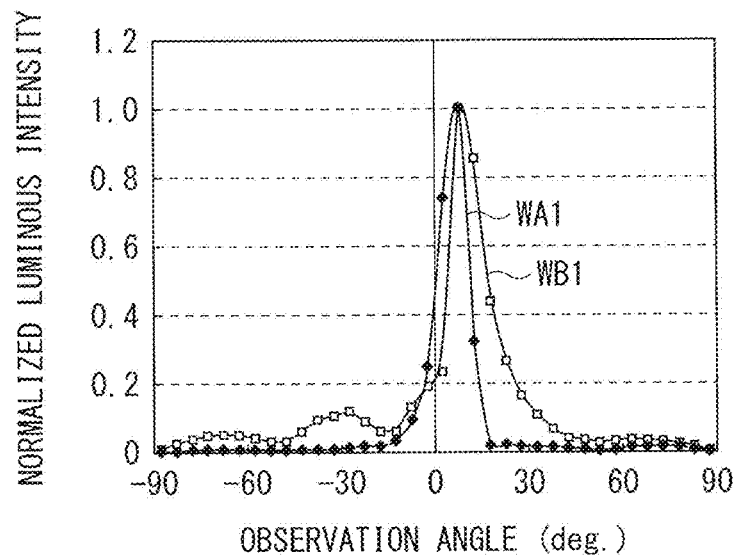
[ FIG. 19 ]
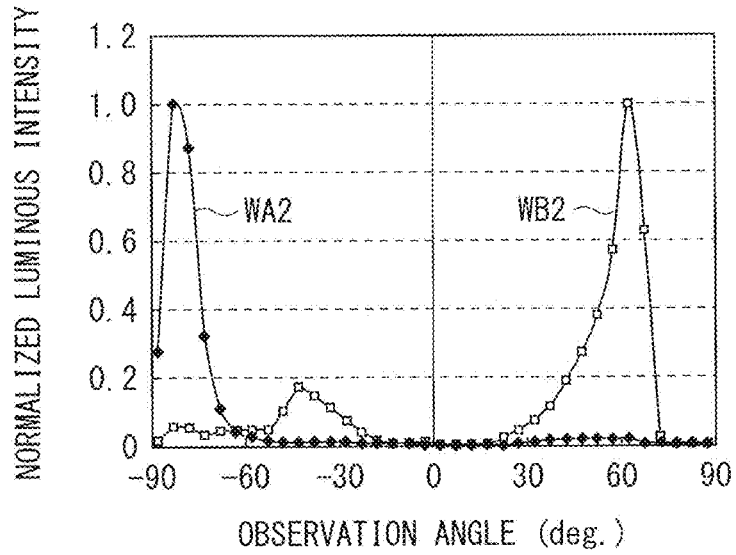

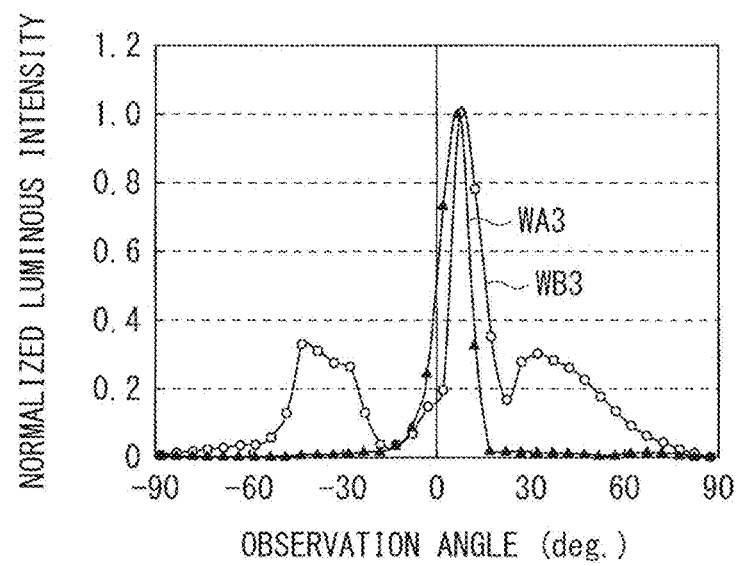

[ FIG. 21A ]
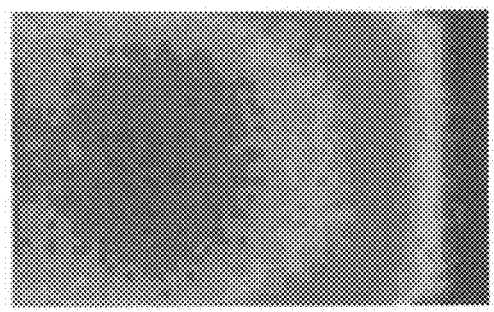
[ FIG. 21B ]
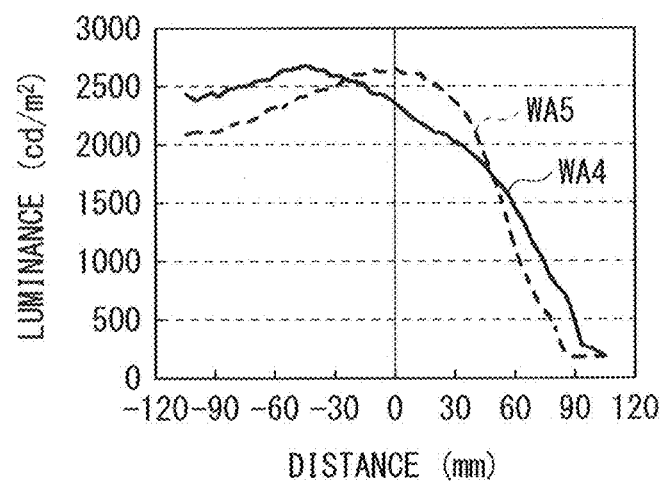

[ FIG. 22A ]
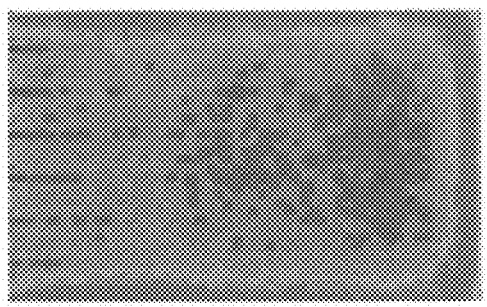
[ FIG. 22B ]
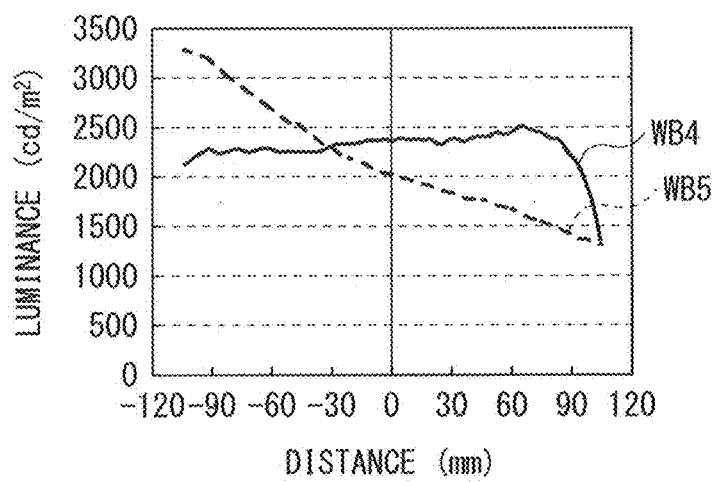

[ FIG. 23A ]
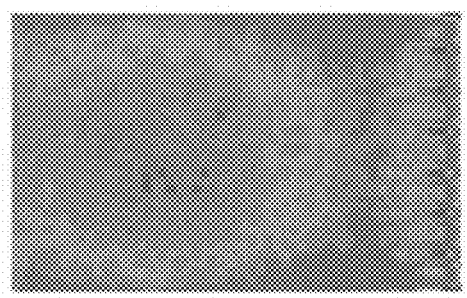
[ FIG. 23B ]
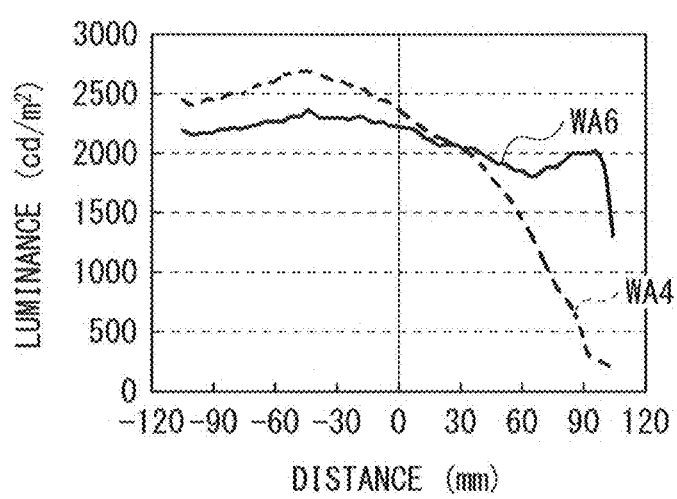

[ FIG. 24A ]
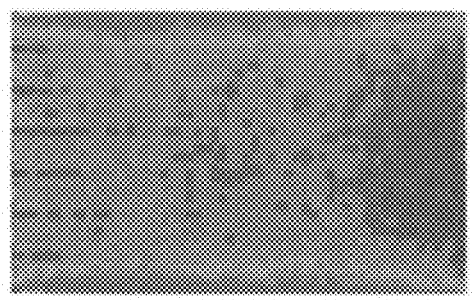
[ FIG. 24B ]
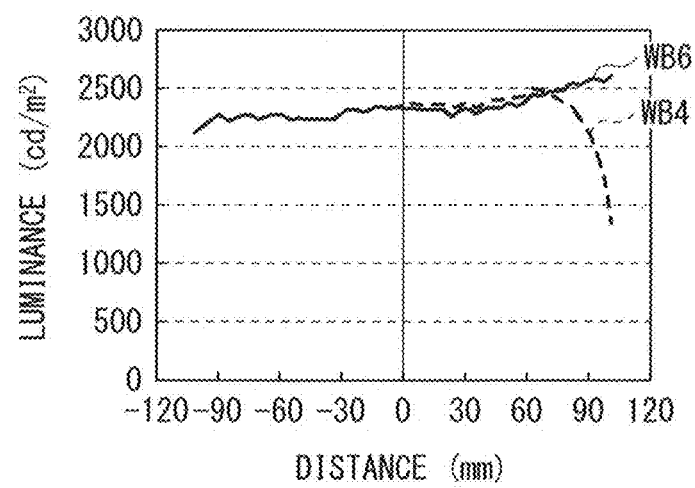

[ FIG. 25A ]
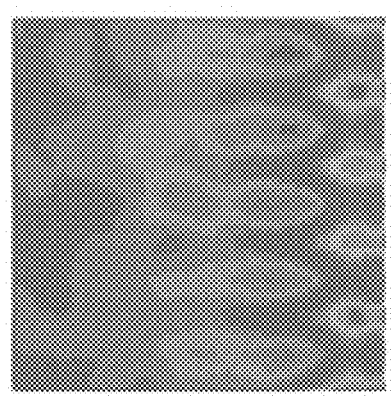
[ FIG. 25B ]
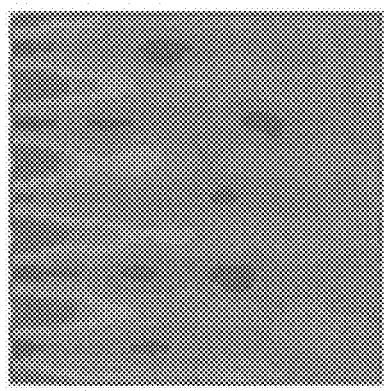

[ FIG. 26A ]
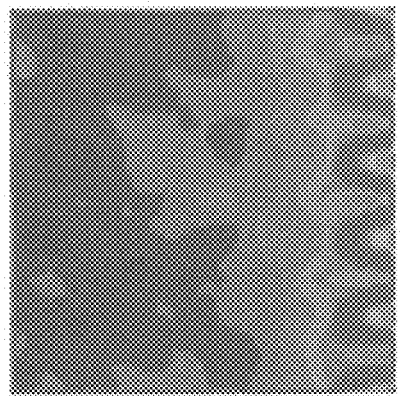
[ FIG. 26B ]
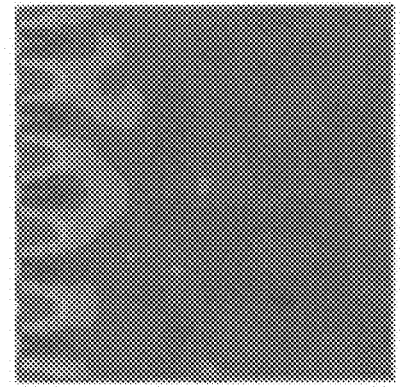

[ FIG. 27 ]
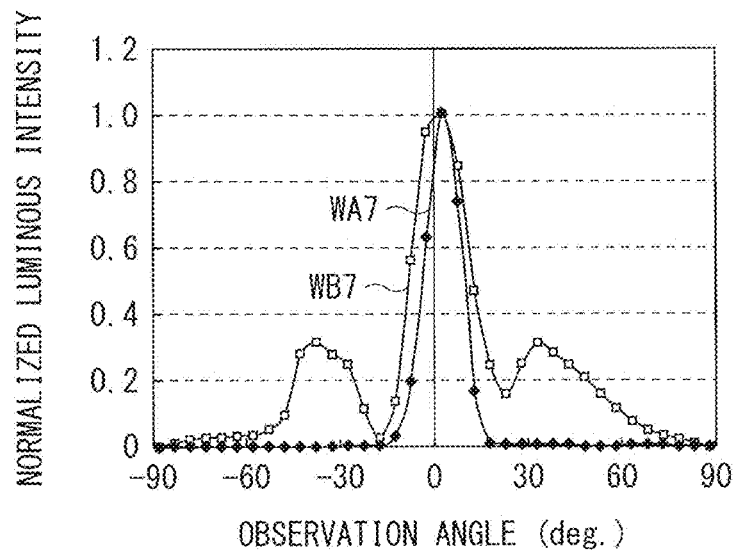
[ FIG. 28 ]
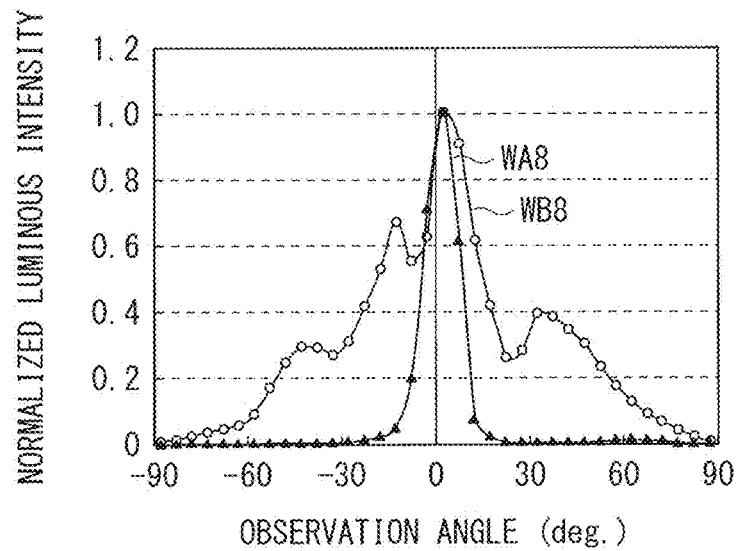

[ FIG. 29A ]
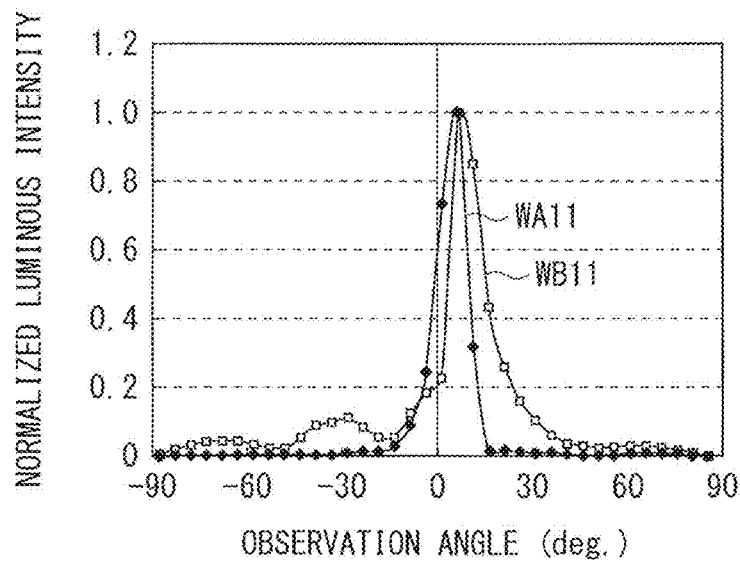
[ FIG. 29B ]
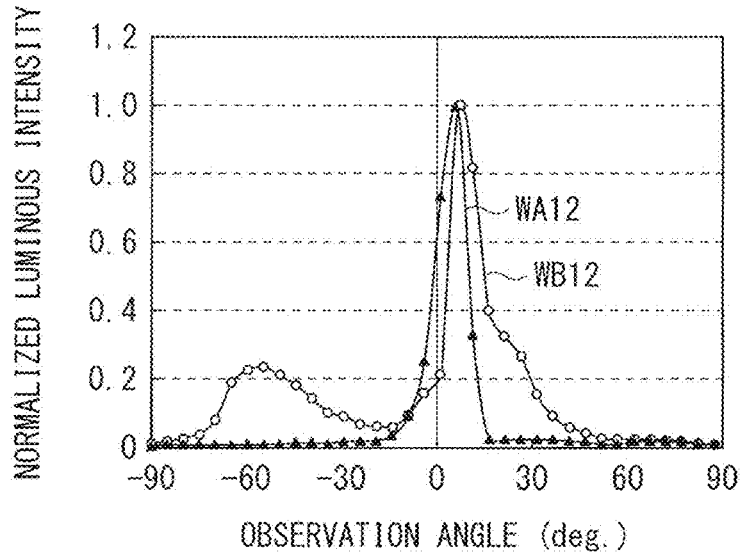

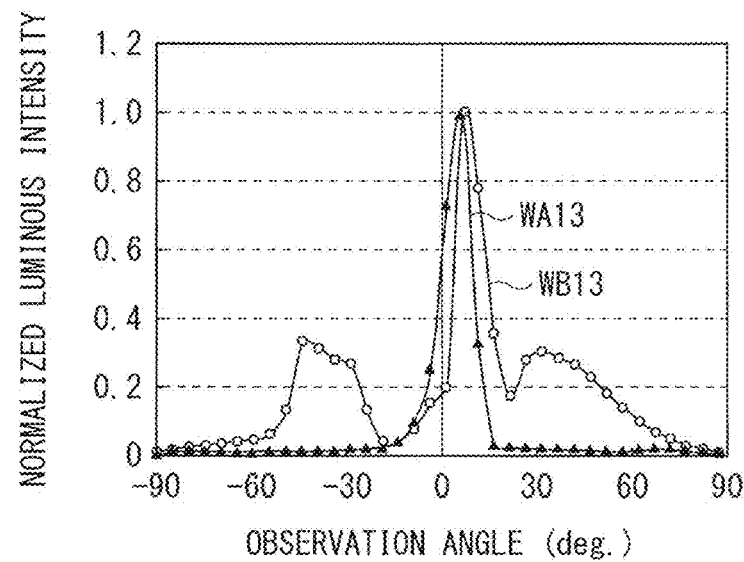
[ FIG. 29C ]
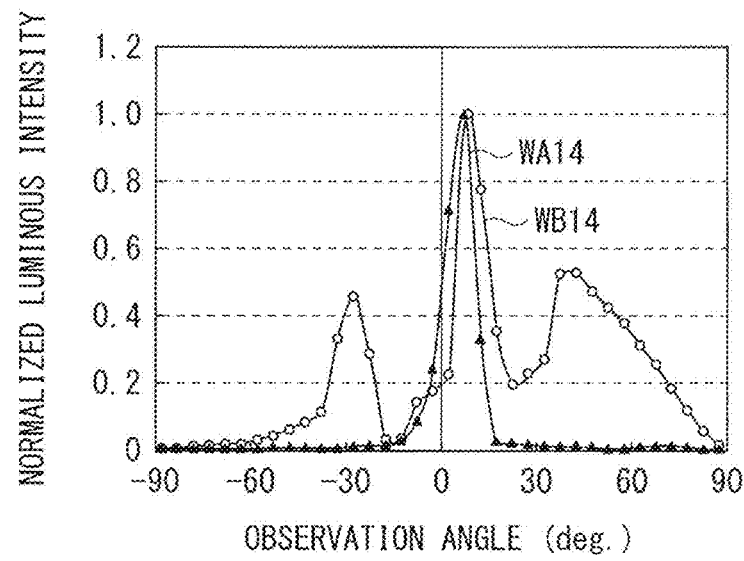
[ FIG. 29D ]

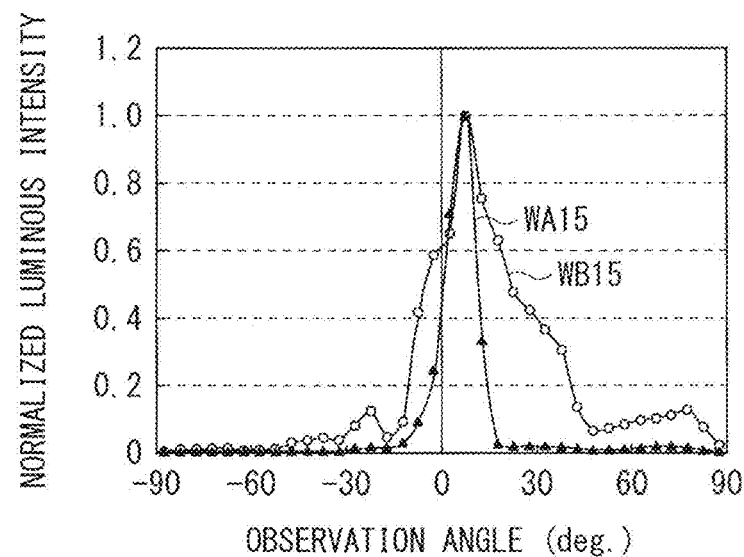
[FIG. 29E]
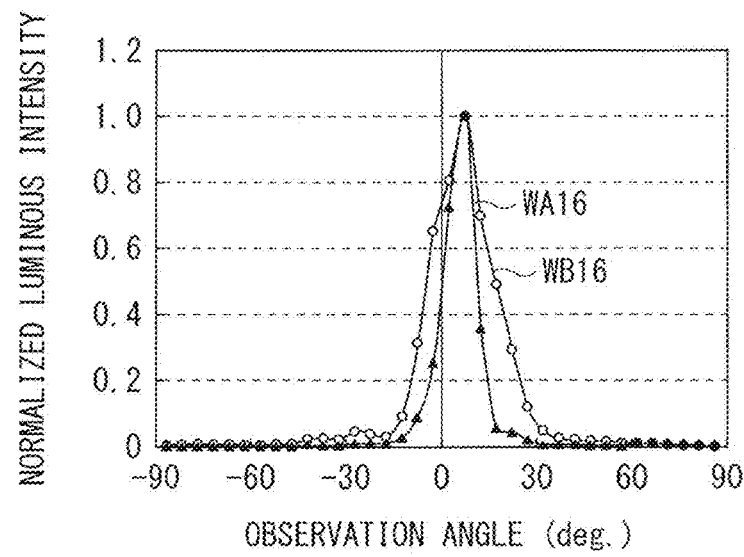
[FIG. 29F]

[ FIG. 30 ]
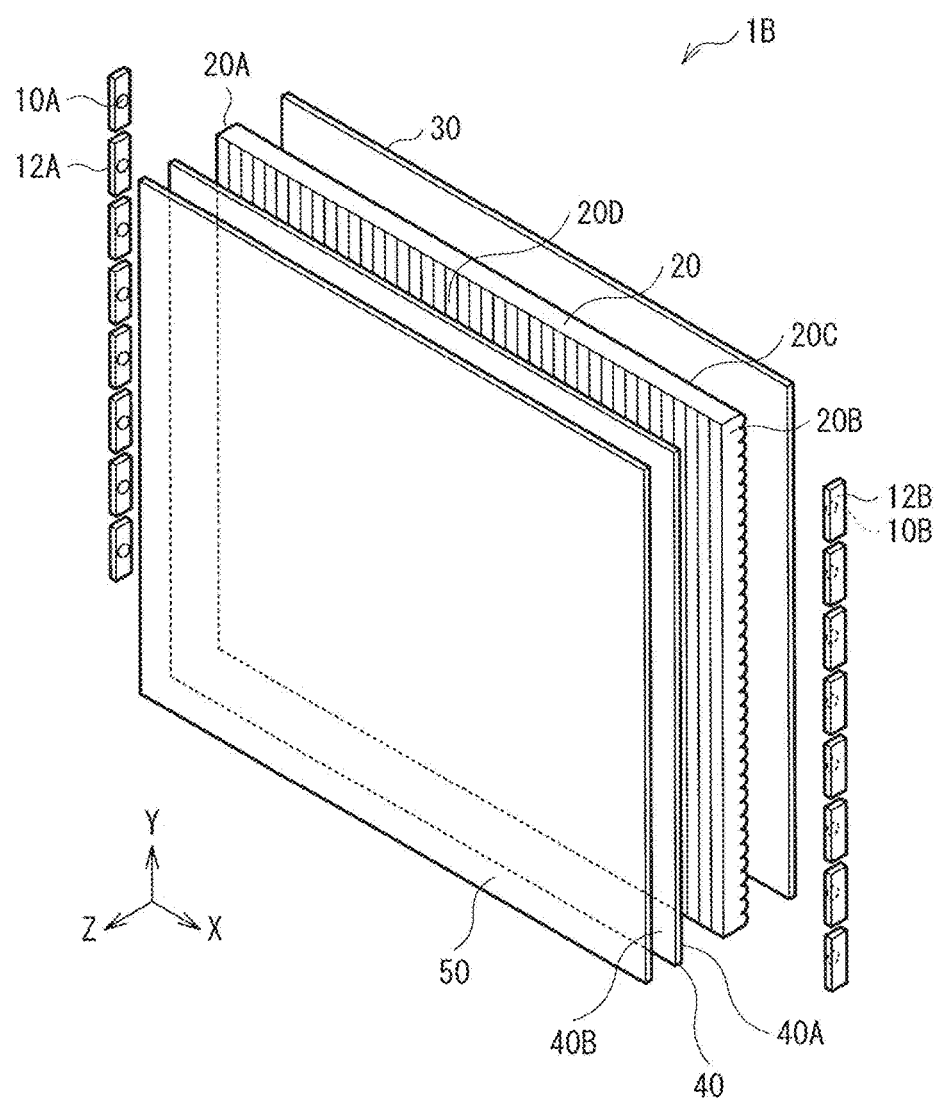

[ FIG. 31 ]
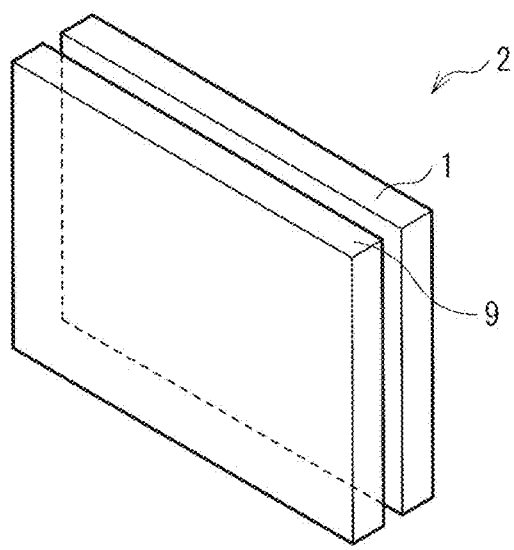

[FIG. 32A]
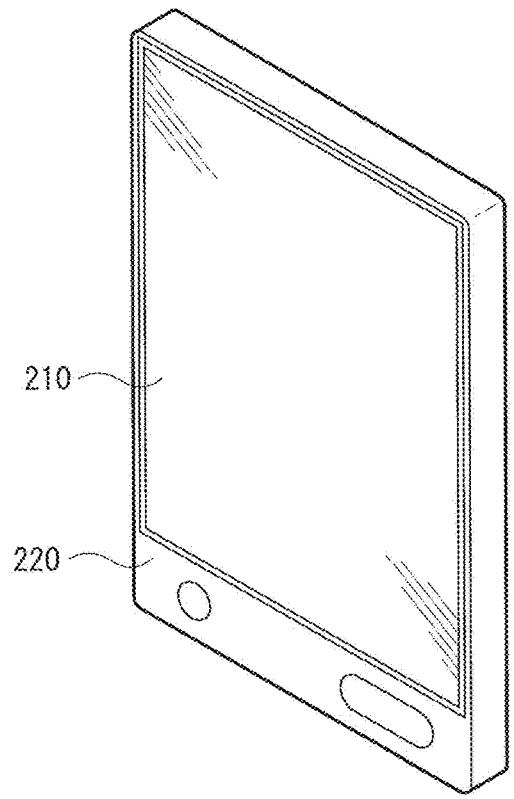
[FIG. 32B]
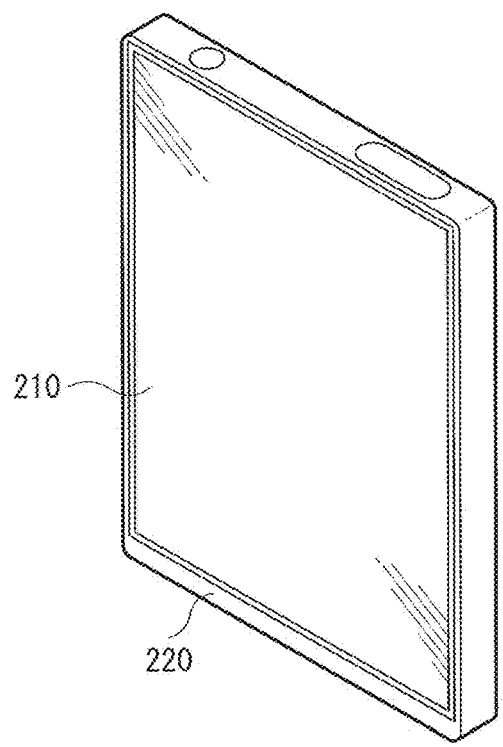

[ FIG. 33 ]
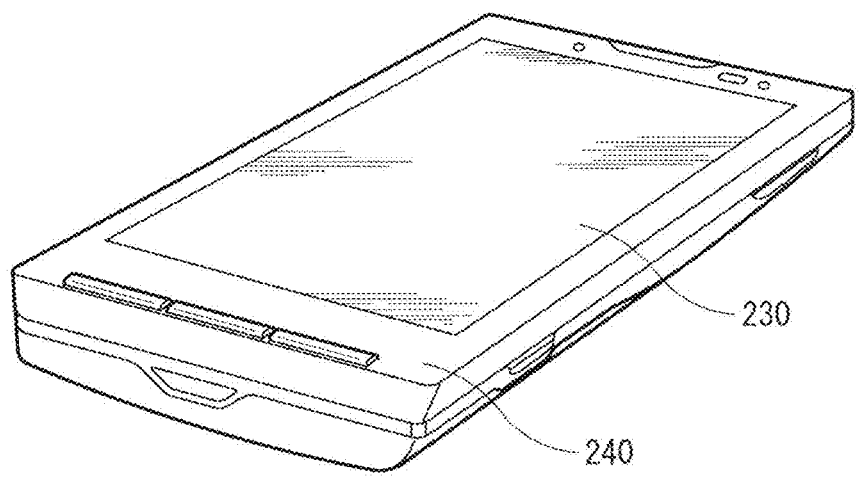
[ FIG. 34 ]
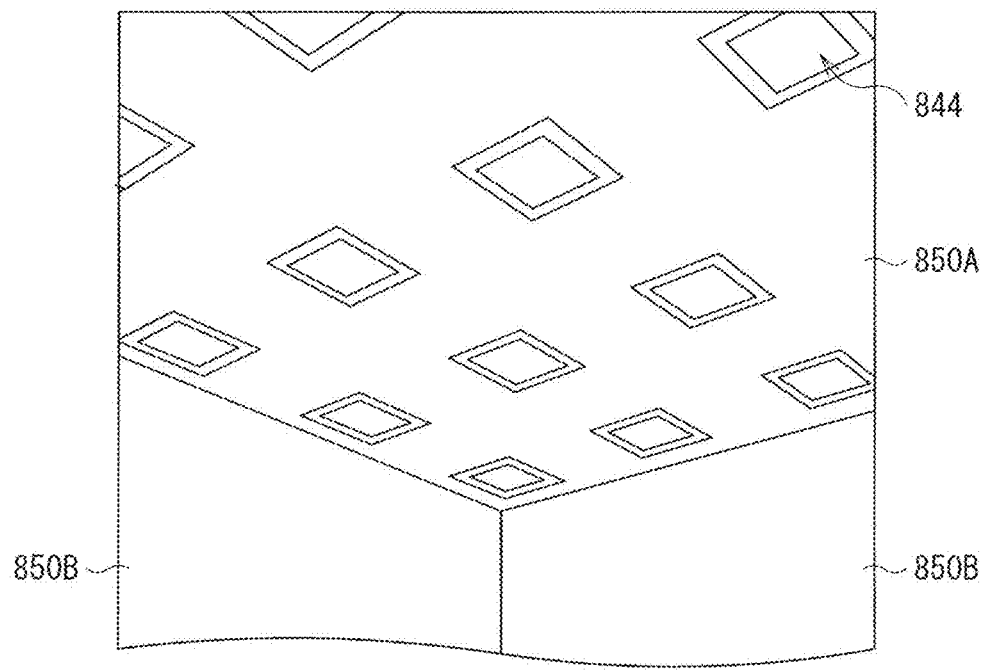

LIGHT EMITTING DEVICE, DISPLAY UNIT, AND ILLUMINATION UNIT

CROSS REFERENCE TO RELATED APPLICATIONS

This application is a U.S. National Phase of International Patent Application No. PCT/JP2015/080190 filed on Oct. 27, 2015, which claims priority benefit of Japanese Patent Application No. JP 2014-253646 filed in the Japan Patent Office on Dec. 16, 2014. Each of the above-referenced applications is hereby incorporated herein by reference in its entirety.

TECHNICAL FIELD

The disclosure relates to a light emitting device that makes it possible to change directivity of light to go out, a display unit having such a light emitting device, and an illumination unit.

BACKGROUND ART

For example, some of liquid crystal display units have a backlight that is able to change directivity of light. For example, PTL 1 and PTL 2 each disclose a liquid crystal display unit including a first light source, a second light source, a first light-guiding plate, and a second light-guiding plate. The first light-guiding plate guides light going out from the first light source to a liquid crystal panel. The second light-guiding plate guides light going out from the second light source to the liquid crystal panel. In addition, PTL 3 discloses a liquid crystal display unit including one light-guiding plate and two light sources. In these liquid crystal display units, directivity of light changes between a case where the first light source emits light and a case where the second light source emits light. It is possible to apply such a liquid crystal display unit to, for example, a car navigation system or a stereoscopic display unit.

CITATION LIST

Patent Literature

PTL 1: Japanese Unexamined Patent Application Publication No. H11-273438
PTL 2: Japanese Unexamined Patent Application Publication No. 2013-137388
PTL 3: Japanese Unexamined Patent Application Publication No. 2014-56201

SUMMARY OF THE INVENTION

Such a liquid crystal display unit, for example, narrows a range of light-outgoing directions (increases directivity) in one mode, and widen the range of light-outgoing directions (decreases directivity of light) in another mode. At the time, it is desirable that distribution of luminance be desirably uniform.

It is therefore desirable to provide a light emitting device, a display unit, and an illumination unit that make it possible to enhance uniformity of luminance distribution.

A light emitting device according to one embodiment of the disclosure includes a first light source and a second light source, a light-guiding plate, a prism sheet, and a reflection sheet. The light-guiding plate has a first main surface and a second main surface that face each other, a first end surface facing the first light source, and a second end surface facing the first end surface and the second light source. The prism sheet is disposed to face the first main surface. The reflection sheet is disposed to face the second main surface. The light-guiding plate includes a plurality of first slope sections and a plurality of second slope sections both provided on one of the first main surface and the second main surface, in which the plurality of first slope sections are provided to allow the light-guiding plate to be thinner in a first direction that extends from the first end surface to the second end surface, and the plurality of second slope sections are provided to allow the light-guiding plate to be thicker in the first direction, and each provided alternately with each of the first slope sections in the first direction. A proportion of area occupied by the plurality of second slope sections increases in a predetermined range from the second end surface, as a distance from the second end surface increases.

A display unit according to one embodiment of the disclosure includes a liquid crystal display section, and a light-emission section. The light-emission section is disposed on a back surface side of the liquid crystal display section. The light-emission section includes a first light source and a second light source, a light-guiding plate, a prism sheet, and a reflection sheet. The light-guiding plate has a first main surface and a second main surface that face each other, a first end surface facing the first light source, and a second end surface facing the first end surface and the second light source. The prism sheet is disposed to face the first main surface. The reflection sheet is disposed to face the second main surface. The light-guiding plate includes a plurality of first slope sections and a plurality of second slope sections both provided on one of the first main surface and the second main surface, in which the plurality of first slope sections are provided to allow the light-guiding plate to be thinner in a first direction that extends from the first end surface to the second end surface, and the plurality of second slope sections are provided to allow the light-guiding plate to be thicker in the first direction, and each provided alternately with each of the first slope sections in the first direction. A proportion of area occupied by the plurality of second slope sections increases in a predetermined range from the second end surface, as a distance from the second end surface increases.

An illumination unit according to one embodiment of the disclosure includes the above-described light emitting device.

In the light emitting device, the display unit, and the illumination unit according to the respective embodiments of the disclosure, a ray of light emitted from the first light source enters the first end surface of the light-guiding plate in a case where the first light source emits light, whereas a ray of light emitted from the second light source enters the second end surface of the light-guiding plate in a case where the second light source emits light. Further, these rays of light go from the first main surface to outside through the prism sheet. On one of the first main surface and the second main surface of the light-guiding plate, the first slope sections and the second slope sections are provided in such a manner that the proportion of the area occupied by the plurality of second slope sections increases in the predetermined range from the second end surface, as the distance from the second end surface increases.

According to the light emitting device, the display unit, and the illumination unit in the respective embodiments of the disclosure, the proportion of the area occupied by the plurality of second slope sections increases in the predetermined range from the second end surface, as the distance from the second end surface increases. It is therefore possible to enhance uniformity of luminance distribution. It is to be noted that the effects described above are not necessarily limitative, and any of effects described in the disclosure may be provided.

BRIEF DESCRIPTION OF THE DRAWINGS

FIG. 1 is a perspective view of a configuration example of a light emitting device according to a first embodiment of the disclosure.

FIG. 2 is an explanatory diagram illustrating a configuration example of a light-guiding plate illustrated in FIG. 1.

FIGS. 3A, 3B and 3C are cross-sectional views of the configuration example of the light-guiding plate illustrated in FIG. 2.

FIG. 4 is an explanatory diagram illustrating a certain parameter in the light-guiding plate illustrated in FIG. 2.

FIG. 5 is an explanatory diagram illustrating another parameter in the light-guiding plate illustrated in FIG. 2.

FIG. 6 is an explanatory diagram illustrating another parameter in the light-guiding plate illustrated in FIG. 2.

FIG. 7 is another cross-sectional view illustrating the configuration example of the light-guiding plate illustrated in FIG. 2.

FIG. 8 is an explanatory diagram illustrating another parameter in the light-guiding plate illustrated in FIG. 2.

FIG. 9 is an explanatory diagram illustrating another parameter in the light-guiding plate illustrated in FIG. 2.

FIG. 10 is a cross-sectional view of a configuration example of a prism sheet illustrated in FIG. 1.

FIG. 11 is an explanatory diagram illustrating a traveling direction of light in the light-guiding plate illustrated in FIG. 1.

FIG. 12 is an explanatory diagram illustrating a traveling direction of light in the prism sheet illustrated in FIG. 1.

FIG. 13 is a characteristic diagram illustrating viewing angle characteristics of the light emitting device illustrated in FIG. 1.

FIG. 14 is another characteristic diagram illustrating viewing angle characteristics of the light emitting device illustrated in FIG. 1.

FIG. 15 is another characteristic diagram illustrating viewing angle characteristics of the light emitting device illustrated in FIG. 1.

FIG. 16 is a table illustrating parameter examples of a light emitting device according to each reference example.

FIG. 17 is a perspective view of a configuration example of a light emitting device according to a reference example.

FIG. 18 is a characteristic diagram illustrating viewing angle characteristics of the light emitting device according to the reference example.

FIG. 19 is another characteristic diagram illustrating viewing angle characteristics of the light emitting device according to the reference example.

FIG. 20 is a characteristic diagram illustrating viewing angle characteristics of a light emitting device according to another reference example.

FIG. 21A is a characteristic diagram illustrating distribution of luminance according to another reference example.

FIG. 21B is another characteristic diagram illustrating distribution of luminance according to another reference example.

FIG. 22A is a characteristic diagram illustrating distribution of luminance according to another reference example.

FIG. 22B is another characteristic diagram illustrating distribution of luminance according to another reference example.

FIG. 23A is a characteristic diagram illustrating distribution of luminance according to another reference example.

FIG. 23B is another characteristic diagram illustrating distribution of luminance according to another reference example.

FIG. 24A is a characteristic diagram illustrating distribution of luminance according to another reference example.

FIG. 24B is another characteristic diagram illustrating distribution of luminance according to another reference example.

FIG. 25A is a characteristic diagram illustrating distribution of luminance according to another reference example.

FIG. 25B is another characteristic diagram illustrating distribution of luminance according to another reference example.

FIG. 26A is a characteristic diagram illustrating distribution of luminance according to another reference example.

FIG. 26B is another characteristic diagram illustrating distribution of luminance according to another reference example.

FIG. 27 is a characteristic diagram illustrating viewing angle characteristics of a light emitting device according to another reference example.

FIG. 28 is a characteristic diagram illustrating viewing angle characteristics of a light emitting device according to another reference example.

FIG. 29A is a characteristic diagram illustrating viewing angle characteristics of a light emitting device according to another reference example.

FIG. 29B is a characteristic diagram illustrating viewing angle characteristics of a light emitting device according to another reference example.

FIG. 29C is a characteristic diagram illustrating viewing angle characteristics of a light emitting device according to another reference example.

FIG. 29D is a characteristic diagram illustrating viewing angle characteristics of a light emitting device according to another reference example.

FIG. 29E is a characteristic diagram illustrating viewing angle characteristics of a light emitting device according to another reference example.

FIG. 29F is a characteristic diagram illustrating viewing angle characteristics of a light emitting device according to another reference example.

FIG. 30 is a perspective view of a configuration example of a light emitting device according to a modification example.

FIG. 31 is a perspective view of a configuration example of a display unit according to a second embodiment.

FIG. 32A is a perspective view of an appearance configuration of an electronic book to which an embodiment is applied.

FIG. 32B is a perspective view of an appearance configuration of another electronic book to which an embodiment is applied.

FIG. 33 is a perspective view of an appearance configuration of a smartphone to which an embodiment is applied.

FIG. 34 is a perspective view of an appearance configuration of an illumination unit to which an embodiment is applied.

MODES FOR CARRYING OUT THE INVENTION

Some embodiments of the disclosure will be described below in detail in the following order, with reference to the drawings.

1. First Embodiment (A Light Emitting Device)
2. Second Embodiment (A Display Unit)
3. Application Examples <1. First Embodiment>
[Configuration Example]

FIG. 1 illustrates a configuration example of a light emitting device (a light emitting device 1) according to a first embodiment. The light emitting device 1 is used, for example, as a backlight that illuminates a transmission liquid-crystal display panel from behind, or as an illumination unit in a place such as a room. The light emitting device 1 includes a plurality of light sources 10A, a plurality of light sources 10B, a light-guiding plate 20, a reflection sheet 30, a prism sheet 40, and a diffusing sheet 50.

The light sources 10A and 10B are each a light source that outputs light to the light-guiding plate 20, and are each configured of, for example, a light emitting diode (LED). The light source 10A is, for example, sealed in a package, and mounted on a light source substrate 12A. The plurality of light sources 10A are arranged side by side in a Y-axis direction (an up-down direction) and disposed to face a light entering surface 20A of the light-guiding plate 20. Similarly, the light source 10B is, for example, sealed in a package, and mounted on a light source substrate 12B. The plurality of light sources 10B are arranged side by side in the Y-axis direction (the up-down direction) and disposed to face a light entering surface 20B of the light-guiding plate 20. A light source section including the plurality of light sources 10A and a light source section including the plurality of light sources 10B are configured to emit light individually. Specifically, the light emitting device 1 narrows a range of light-outgoing directions (increases directivity) in a case where the plurality of light sources 10A emit light, and widens the range of light-outgoing directions (decreases directivity) in a case where the plurality of light sources 10B emit light, as will be described later.

The light-guiding plate 20 guides light going out from the plurality of light sources 10A and 10B to the prism sheet 40. The light-guiding plate 20 mainly includes, for example, transparent thermoplastic resin such as polycarbonate resin and acrylic resin (e.g., polymethyl methacrylate (PMMA). The light-guiding plate 20 is a substantially rectangular parallelepiped member having a pair of main surfaces (a front surface and a back surface) facing each other in a Z-axis direction (a front-back direction), and four end surfaces (side surfaces) linking four sides of one of the main surfaces to four sides of the other. Among the four end surfaces, two surfaces facing each other in an X-axis direction (a lateral direction) are the light entering surfaces 20A and 20B. The light entering surface 20A is a surface that faces the plurality of light sources 10A, and the light entering surface 20B is a surface that faces the plurality of light sources 10B. Further, of the pair of main surfaces, the front surface is a light outgoing surface 20C, and the back surface is a light outgoing surface 20D. The light outgoing surface 20C is a surface that faces the prism sheet 40, and the light outgoing surface 20D is a surface that faces the reflection sheet 30. The light-guiding plate 20 guides light entering from the light entering surface 20A to the light outgoing surface 20C, and guides light entering from the light entering surface 20B to the light outgoing surface 20C.

The light outgoing surface 20C (the front surface) of the light-guiding plate 20 has a lenticular shape as illustrated in FIG. 1. In other words, on the light outgoing surface 20C, lenses each having a substantially semicircular cross-sectional shape in an YZ plane and extending in the X-axis direction are arranged side by side in the Y-axis direction.

Further, a plurality of prisms PA and PB are formed on the light outgoing surface 20D (the back surface) of the light-guiding plate 20, as will be described below.

FIG. 2 illustrates the light-guiding plate 20. FIGS. 3A, 3B and 3C illustrate a configuration example of the light outgoing surface 20D (the back surface) of the light-guiding plate 20. Specifically, FIG. 3A illustrates a shape of the light outgoing surface 20D in a portion W1 illustrated in FIG. 2, FIG. 3B illustrates a shape of the light outgoing surface 20D in a portion W2 illustrated in FIG. 2, and FIG. 3C illustrates a shape of the light outgoing surface 20D in a portion W3 illustrated in FIG. 2. In FIGS. 3A, 3B and 3C, inclinations and the like are exaggerated for convenience of description.

In the light-guiding plate 20, the plurality of prisms PA extending in the Y-axis direction are arranged side by side in the X-axis direction, over the entire light outgoing surface 20D. The prism PA has a ridge and two surfaces (a gentle slope PA1 and a steep slope PA2) provided with the ridge in between. The ridge of the prism PA is formed to extend in the Y-axis direction. The gentle slope PA1 is such a slope that the light-guiding plate 20 becomes thinner in the X-axis direction. The steep slope PA2 is such a slope that the light-guiding plate 20 becomes thicker in the X-axis direction. A level of inclination in the steep slope PA2 is greater than a level of inclination in the gentle slope PA1. In this way, the plurality of prisms PA are formed in a stair-like shape on the light outgoing surface 20D of the light-guiding plate 20.

In this example, the prisms PA have respective widths LA equal to one another. Specifically, the width LA may be, for example, 0.2 [mm]. In addition, an inclination angle (a gentle slope angle $\theta1$) of the gentle slope PA1, an inclination angle (a steep slope angle $\theta2$) of the steep slope PA2, and a height HA (a height difference of the steep slope PA2) of the prism PA change depending on X-axis coordinates in the light-guiding plate 20, as will be described below.

FIG. 4 illustrates the gentle slope angle $\theta1$ of the gentle slope PA1, and FIG. 5 illustrates the height HA of the prism PA. In these figures, a horizontal axis indicates a distance (coordinates) from a center in the lateral direction of the light-guiding plate 20, when viewed from the back-surface side of the light-guiding plate 20. In other words, in FIGS. 4 and 5, the closer to left, the closer to the light entering surface 20B, whereas the closer to right, the closer to the light entering surface 20A. In these figures, portions corresponding to the portions W1 to W3 illustrated in FIG. 2 are marked for convenience of description. It is to be noted that the steep slope angle $\theta2$ is 49 degrees−$\theta1$, in this example. In other words, the steep slope angle $\theta2$ is about 49 degrees.

Except for a portion in proximity to the light entering surface 20A (a right end), the height HA of the prism PA gradually increases as a distance from the light entering surface 20B (a left end) increases, as illustrated in FIG. 5. In contrast, the gentle slope angle $\theta1$ gradually decreases as illustrated in FIG. 4. The widths LA of the respective prisms PA are equal to one another, and the steep slope angle $\theta2$ is about 49 degrees and substantially uniform. Hence, an area proportion of the steep slope PA2 in the prism PA gradually increases, as the distance from the light entering surface 20B (the left end) increases and as the height HA of the prism PA increases. Further, in the portion in proximity to the light entering surface 20A (the right end), the height HA is small, and the gentle slope angle $\theta1$ is large.

FIG. 6 illustrates a thickness D of the light-guiding plate 20. In FIG. 6, portions corresponding to the portions W1 to W3 illustrated in FIG. 2 are marked for convenience of description. The thickness D of the light-guiding plate 20 gradually increases from the light entering surface 20B (the left end) to a portion near the center and gradually decreases from the portion near the center to the light entering surface 20A (the right end), as illustrated in FIG. 6. The thickness D is slightly large near the light entering surface 20A (the right end). In other words, the thickness D of the light-guiding plate 20 at the right end and that at the left end of each of the prisms PA are not necessarily the same. Hence, the thickness D of the light-guiding plate 20 changes depending on the X-axis coordinates. Specifically, in a range from the light entering surface 20B (the left end) to the portion near the center, the thickness D of the light-guiding plate 20 gradually increases, because the height HA of the prism PA is small (FIG. 5) and the proportion of the steep slope PA2 in each of the prisms PA is small. Further, in a range from the portion near the center to the light entering surface 20A (the right end), the thickness D of the light-guiding plate 20 gradually decreases, because the height HA of the prism PA is large (FIG. 5) and the proportion of the steep slope PA2 in the prism PA is large.

In addition, in the light-guiding plate 20, the prism PB is formed on each of the gentle slopes PA1, in a portion (for example, the portion W3) which is in proximity to the light entering surface 20A of the light outgoing surface 20D as illustrated in FIGS. 2 and 3. In this example, the one prism PB is formed near a center of each of the gentle slopes PA1.

FIG. 7 illustrates a configuration example of the prism PB. The prism PB has a ridge and two surfaces (a gentle slope PB1 and a steep slope PB2) provided with the ridge in between. The ridge of the prism PB is formed to extend in the Y-axis direction. The gentle slope PB1 is such a slope that the light-guiding plate 20 becomes thinner in the X-axis direction. The steep slope PB2 is such a slope that the light-guiding plate 20 becomes thicker in the X-axis direction. A level of inclination in the steep slope PB2 is greater than a level of inclination in the gentle slope PB1. In addition, the level of inclination in the gentle slope PB1 of the prism PB is greater than the level of inclination in the gentle slope PA1 of the prism PA. An inclination angle (a gentle slope angle θ3) of the gentle slope PB1, an inclination angle (a steep slope angle θ4) of the steep slope PB2, a width LB of the prism PB, and a height HB (a height difference of the steep slope PB2) of the prism PB change depending on the X-axis coordinates in the light-guiding plate 20, as will be described below.

FIG. 8 illustrates the gentle slope angle θ3 of the gentle slope PB1. FIG. 9 illustrates a proportion (an area ratio S) of the gentle slope PB1 of the prism PB in the gentle slope PA1 of the prism PA. It is to be noted that, in this example, the steep slope angle θ4 is 49 degrees−θ3, the width LB corresponds to the area ratio S, and the height HB corresponds to the angles θ3 and θ4 as well as the width LB.

In the portion in proximity to the light entering surface 20A (the right end), the area ratio S of the prism PB increases as a distance to the light entering surface 20A decreases, as illustrated in FIG. 9. Further, in the portion in proximity to the light entering surface 20A (the right end), the gentle slope angle θ3 of the prism PB increases as the distance to the light entering surface 20A decreases, as illustrated in FIG. 8. In other words, the prism PB is provided only in the portion in proximity to the light entering surface 20A (the right end), and becomes larger as the distance to the light entering surface 20A decreases.

The prisms PA and PB may be generated by, for example, trimming a die of the light-guiding plate 20, and then transferring a shape thereof by injection molding. The die of the light-guiding plate 20 is trimmed using a single crystal diamond bit. It is to be noted that the value of each of the angles θ1 to θ4 described above is a mere example, and, for example, unevenness substantially same as that of processing accuracy may occur. Specifically, in a case where a corner of each of the prisms PA and PB is a curved surface due to the incomplete transfer resulting from the injection molding, a portion of each of the gentle slopes PA1 and PB1 and the steep slopes PA2 and PB2 is a curved surface. In this case, for example, the gentle slope angle θ1 may be an average value of the gentle slope angles θ1 in the gentle slope PA1. This holds true for the angles θ2 to θ4.

In this way, the plurality of prisms PA and PB are formed on the light outgoing surface 20D (the back surface) of the light-guiding plate 20. The light emitting device 1 therefore narrows the range of light-outgoing directions (increases the directivity) in a case where the plurality of light sources 10A emit light, and widens the range of light-outgoing directions (decreases the directivity) in a case where the plurality of light sources 10B emit light, as will be described later.

The reflection sheet 30 (FIG. 1) is provided to face the light outgoing surface 20D (the back surface) of the light-guiding plate 20, and reflects light going out from the light outgoing surface 20D of the light-guiding plate 20. Specifically, the reflection sheet 30 returns light, which leaks from the light outgoing surface 20D after entering the light-guiding plate 20 from the light sources 10A and 10B, to the light-guiding plate 20. The reflection sheet 30 has, for example, functions such as reflection, diffusion, and scattering. This allows the reflection sheet 30 to increase luminance by efficiently utilizing light from the light sources 10A and 10B.

The reflection sheet 30 is made of, for example, foamed polyethylene terephthalate (PET), a silver vapor deposition film, a multilayered reflection film, or white PET. To provide the reflection sheet with a function of regular reflection (specular reflection), it is preferable to perform processing such as silver vapor deposition, aluminum vapor deposition, and multilayer film reflection on a surface of the reflection sheet 30. To provide the reflection sheet 30 with a minute shape, the reflection sheet 30 may be integrally formed by a technique such as hot pressing molding using thermoplastic resin and melt extrusion molding. Alternatively, for example, the reflection sheet 30 may be formed by applying energy-ray (e.g., ultraviolet-ray) curable resin to a base made of a material such as PET and then transferring a shape to the energy-ray curable resin. Here, examples of thermoplastic resin include polycarbonate resin, acrylic resin such as polymethyl methacrylate resin (PMMA), polyester resin such as polyethylene terephthalate, amorphous copolymerization polyester resin such as MS (a copolymer of methyl methacrylate and styrene), polystyrene resin, and polyvinyl chloride resin. In addition, the base may be made of glass, if the shape is transferred to the energy-ray (e.g., ultraviolet-ray) curable resin.

The prism sheet 40 (FIG. 1) is a sheet on which a plurality of prisms Q are formed. The prism sheet 40 guides light going out from the light outgoing surface 20C (the front surface) of the light-guiding plate 20 to the diffusing sheet 50. Of the prism sheet 40, a back surface is a light entering surface 40A, and a front surface is a light outgoing surface 40B. The light entering surface 40A is a surface facing the light outgoing surface 20C of the light-guiding plate 20, and the plurality of prisms Q are formed on the light entering surface 40A. The light outgoing surface 40B is a surface facing the diffusing sheet 50. The prism sheet 40 may be formed in a manner similar to the reflection sheet 30. Specifically, the prism sheet 40 may be formed by, for example, applying energy-ray (e.g., ultraviolet-ray) curable resin to a base made of a material such as PET and then transferring a prism shape to the energy-ray curable resin. Alternatively, a base and a prism shape may be integrally formed by a technique such as hot pressing molding using thermoplastic resin such as PC (polycarbonate).

FIG. 10 illustrates a configuration example of the light entering surface 40A (the back surface) of the prism sheet 40. In the prism sheet 40, the plurality of prisms Q extending in the Y-axis direction are arranged side by side in the X-axis direction, over the entire light entering surface 40A. The plurality of prisms Q each have a substantially triangular cross-sectional shape in an XZ plane. The prism Q has a ridge and two surfaces QA and QB provided with the ridge in between. The ridge of the prism Q is formed to extend in the Y-axis direction. The surface QA is such a surface that the prism sheet 40 becomes thinner in the X-axis direction. The surface QB is such a surface that the prism sheet 40 becomes thicker in the X-axis direction.

To be more specific, the surface QA includes two surfaces QA1 and QA2 in order from the ridge side. In this example, an angle θA1 between the surface QA1 and a normal (the Z-axis) of the prism sheet 40 is 34 degrees, and the surface QA1 has a width of 9 [μm] in the X-axis direction. In addition, in this example, an angle θA2 between the surface QA2 and the normal of the prism sheet 40 is 30 degrees, and a surface QB1 has a width of 6.7 [μm] in the X-axis direction. Similarly, to be more specific, the surface QB includes three surfaces, which are surfaces QB1, QB2, and QB3 in order from the ridge side. In this example, an angle θB1 between the surface QB1 and the normal of the prism sheet 40 is 37 degrees, and the surface QB1 has a width of 6 [μm] in the X-axis direction. In addition, in this example, an angle θB2 between the surface QB2 and the normal of the prism sheet 40 is 29 degrees, and the surface QB2 has a width of 4.5 [μm] in the X-axis direction. Moreover, in this example, an angle θB3 between the surface QB3 and the normal of the prism sheet 40 is 23 degrees, and the surface QB3 has a width of is 3.8 [μm] in the X-axis direction.

In this way, the prism Q has an asymmetry shape in the X-axis direction. In addition, the angle changes by four degrees (=34−30) on the surface QA, and the angle changes by 14 degrees (=37−23) on the surface QB. Thus, in the prism Q, the change of the angle on the surface QB is greater than the change of the angle on the surface QA. Hence, the light emitting device 1 narrows the range of light-outgoing directions (increases the directivity) in a case where the plurality of light sources 10A emit light, and widens the range of light-outgoing directions (decreases the directivity) in a case where the plurality of light sources 10B emit light, as will be described later.

The diffusing sheet 50 is a sheet that diffuses light going out from the light outgoing surface 40B of the prism sheet 40, and includes, for example, a microlens array (MLA). For example, the light emitting device 1 improves viewing angle characteristics owing to the provision of the diffusing sheet 50, when causing the plurality of light sources 10B to emit light and widening the range of light-outgoing directions (decreases the directivity), as will be described later.

Here, the light source 10A corresponds to a specific example of a "first light source" in the disclosure, and the light source 10B corresponds to a specific example of a "second light source" in the disclosure. The light entering surface 20A corresponds to a specific example of a "first end surface" in the disclosure, and the light entering surface 20B corresponds to a specific example of a "second end surface" in the disclosure. The light outgoing surface 20C corresponds to a specific example of a "first main surface" in the disclosure, and the light outgoing surface 20D corresponds to a specific example of a "second main surface" in the disclosure. The gentle slope PA1 corresponds to a specific example of a "first slope section" in the disclosure, and the steep slope PA2 corresponds to a specific example of a "second slope section" in the disclosure. The gentle slope PB1 corresponds to a specific example of a "third slope section" in the disclosure, and the steep slope PB2 corresponds to a specific example of a "fourth slope section" in the disclosure. The surface QB corresponds to a specific example of a "first surface" in the disclosure, and the surface QA corresponds to a specific example of a "second surface" in the disclosure.

[Operation and Workings]

Next, operation and workings of the light emitting device 1 of the present embodiment will be described.

(Outline of Overall Operation)

First, outline of overall operation of the light emitting device 1 will be described with reference to FIG. 1, etc. The plurality of light sources 10A and 10B output light. The light-guiding plate 20 guides light going out from the plurality of light sources 10A and 10B, to the prism sheet 40. The reflection sheet 30 reflects light going out from the light outgoing surface 20D (the back surface) of the light-guiding plate 20. The prism sheet 40 guides light going out from the light outgoing surface 20C of the light-guiding plate 20, to the diffusing sheet 50. The diffusing sheet 50 diffuses light going out from the light outgoing surface 40B of the prism sheet 40.

(Workings of Light-Guiding Plate 20)

The light-guiding plate 20 guides light going out from the plurality of light sources 10A and 10B, to the prism sheet 40. At the time, the light emitting device 1 narrows the range of light-outgoing directions (increases the directivity) in a case where the plurality of light sources 10A emit light, and widens the range of light-outgoing directions (decreases the directivity) in a case where the plurality of light sources 10B emit light, as will be described below. The light emitting device 1 narrows and widens the range of light-outgoing directions, by using the plurality of prisms PA and PB formed on the light outgoing surface 20D (the back surface) of the light-guiding plate 20.

FIG. 11 illustrates an example of a light ray in the light-guiding plate 20. In this example, behavior in the portion near the center of the light-guiding plate 20 is illustrated. Only the prisms PA are formed in this portion. Light LA going out from the light source 10A and light LB going out from the light source 10B will each be described below as an example.

In a case where the light source 10A emits light, the light LA going out from the light source 10A first enters the light-guiding plate 20 from the light entering surface 20A. Upon entering the light-guiding plate 20, the light LA travels while repeating reflection between the light outgoing surface 20C (the front surface) and the gentle slope PA1 of the light outgoing surface 20D (the back surface), as illustrated in FIG. 11. At the time, a traveling direction (a traveling angle) of the light LA gradually changes, because the gentle slope PA1 has an inclination. As a result, an incident angle at the light outgoing surface 20C changes each time the reflection occurs. After such repeats of reflection, the light LA goes out from the light outgoing surface 20C (the front surface) in a direction deviating from a normal direction (the Z-axis direction) of the light outgoing surface 20C, when the incident angle at the light outgoing surface 20C falls within a predetermined angle range. In this way, the range of light-outgoing directions of the light LA going out from the light-guiding plate 20 narrows in a case where the light source 10A emits light.

On the other hand, in a case where the light source 10B emits light, the light LB going out from the light source 10B first enters the light-guiding plate 20 from the light entering surface 20B. Subsequently, light LB1, which is a portion of the light LB entering the light-guiding plate 20, is, for example, reflected at the steep slope PA2 of the light outgoing surface 20D (the back surface). The light LB1 then goes out from the light outgoing surface 20C (the front surface) in a direction close to the normal direction (the Z-axis direction) of the light outgoing surface 20C. Further, for example, light LB2 that is another portion of the light entering the light-guiding plate 20 passes through the steep slope PA2 of the light outgoing surface 20D (the back surface), following which the light LB2 is subsequently reflected off the reflection sheet 30 and then enter the light-guiding plate 20 again. Afterward, the light LB2 goes out from the light outgoing surface 20C (the front surface), in a direction deviating from the normal direction (the Z-axis direction) of the light outgoing surface 20C. In this way, in a case where the light source 10B emits light, the range of light-outgoing directions of the light LB going out from the light-guiding plate 20 widens.

It is to be noted that although the workings of the prism PA are described in this example, similar workings apply to the prism PB as well.

As described above, in the light-guiding plate 20, the plurality of prisms PA and PB are provided on the light outgoing surface 20D (the back surface). It is therefore possible to narrow the range of light-outgoing directions (increase the directivity) in a case where the plurality of light sources 10A emit light and to widen the range of light-outgoing directions (decrease the directivity) in a case where the plurality of light sources 10B emit light.

(Workings of Prism Sheet 40)

The prism sheet 40 guides light going out from the light outgoing surface 20C of the light-guiding plate 20, to the diffusing sheet 50. At the time, the light emitting device 1 narrows the range of light-outgoing directions in a case where the plurality of light sources 10A emit light (increases the directivity) and widens the range of light-outgoing directions (decreases the directivity) in a case where the plurality of light sources 10B emit light, as will be described below. The light emitting device 1 narrows and widens the range of light-outgoing directions, by using the prisms Q each having the asymmetry shape in the X-axis direction.

FIG. 12 illustrates an example of a light ray in the prism sheet 40. The light LA going out from the light-guiding plate 20 in a case where the light source 10A emits light and the light LB going out from the light-guiding plate 20 in a case where the light source 10B emits light will each be described below as an example.

In a case where the light source 10A emits light, the light LA going out from the light-guiding plate 20 enters from the light entering surface 40A of the prism sheet 40. The light LA is subsequently reflected at the surface QA of the prism Q, following which the light LA goes out from the light outgoing surface 40B in a direction close to a normal direction (the Z-axis direction) of the light outgoing surface 40B. At the time, even if outgoing directions of respective rays of the light LA going out from the light-guiding plate 20 are slightly different, traveling directions of the respective rays become closer to each other because the rays are reflected at the surfaces QA1 and QA2 having slightly different inclinations, as illustrated in FIG. 12.

Meanwhile, in a case where the light source 10B emits light, the light LB going out from the light-guiding plate 20 enters from the light entering surface 40A of the prism sheet 40. The light LB is then reflected at the surface QB of the prism Q, and the reflected light LB goes out in wide directions centered at the normal direction (the Z-axis direction) of the light outgoing surface 40B. At the time, even if outgoing directions of respective rays of the light LB going out from the light-guiding plate 20 are the same, the rays of the light LB travel in directions that vary from point to point (the surfaces QB1 to QB3) where reflection occurs in the prism plane QB, as illustrated in FIG. 12. As described above, the range of light-outgoing directions of the light LB going out from the light-guiding plate 20 is wide in a case where the light source 10B emits light. A range of traveling directions of the light LB is further increased by the prism sheet 40, and thus the range of light-outgoing directions of the light LB going out from the light outgoing surface 40B of the prism sheet 40 further widens.

In this way, the plurality of prisms Q are provided on the light outgoing surface 40B (the back surface) in the prism sheet 40. It is therefore possible to narrow the range of light-outgoing directions (increase the directivity) in a case where the plurality of light sources 10A emit light, and to widen the range of light-outgoing directions (decrease the directivity) in a case where the plurality of light sources 10B emit light.

(Viewing Angle Characteristics of Light Emitting Device 1)

FIG. 13 illustrates viewing angle characteristics of the light emitting device 1 in a case where the light source 10A emits light. FIG. 14 illustrates viewing angle characteristics of the light emitting device 1 in a case where the light source 10B emits light. In FIGS. 13 and 14, a horizontal axis indicates a horizontal (lateral) observation angle, and a vertical axis indicates a vertical (up-down) observation angle. FIGS. 13 and 14 each illustrate nine contour lines. A peak luminous intensity observed in a direction, in which each of the horizontal observation angle and the vertical observation angle is zero degree, is divided into ten equal portions by the nine contour lines.

FIG. 15 illustrates viewing angle characteristics of the light emitting device 1. WHA and WVA represent viewing angle characteristics of the light emitting device 1 in a case where the light source 10A emits light. WHA indicates a horizontal viewing angle characteristic, and WVA indicates a vertical viewing angle characteristic. WHB and WVB represent viewing angle characteristics of the light emitting device 1 in a case where the light source 10B emits light. WHB indicates a horizontal viewing angle characteristic, and WVB indicates a vertical viewing angle characteristic. In FIG. 15, a horizontal axis indicates an observation angle (the horizontal observation angle or the vertical observation angle), and a vertical axis indicates a normalized luminous intensity. The normalized luminous intensity is a luminous intensity having a peak value of 1.

As illustrated in FIGS. 13 to 15, luminance decreases as the horizontal observation angle and the vertical observation angle deviate from zero degree. At the time, it is possible to narrow the viewing angles in both the horizontal and the vertical directions in a case where the light source 10A emits light as illustrated in FIG. 13. It is also possible to widen the viewing angles in both the horizontal and the vertical directions in a case where the light source 10B emits light as illustrated in FIG. 14.

Next, workings of the present embodiment will be described using some reference examples.

FIG. 16 illustrates each of parameters in light emitting devices S0 to S5 according to six reference examples, together with each of parameters in the light emitting device 1. In FIG. 16, parameters surrounded by a bold line are the same as the parameters of the light emitting device 1. The light emitting devices S0 to S5 will be described below in detail.

(Light Emitting Device S0)

FIG. 17 illustrates a configuration example of the light emitting device S0. The light emitting device S0 includes a light-guiding plate 120 and a prism sheet 140.

The light-guiding plate 120 is a substantially rectangular parallelepiped member having a pair of main surfaces (a front surface and a back surface) facing each other in the Z-axis direction (the front-back direction), and four end surfaces (side surfaces) linking four sides of one of the main surfaces to four sides of the other. Among the four end surfaces, two surfaces facing each other in the X-axis direction (the lateral direction) are light entering surfaces 120A and 120B. Further, of the pair of main surfaces, the front surface is a light outgoing surface 120C, and the back surface is a light outgoing surface 120D.

Lenses each having a triangular cross-sectional shape in the YZ plane and extending in the X-axis direction are provided on the light outgoing surface 120C (the front surface) of the light-guiding plate 120, as illustrated in FIG. 17. These lenses are arranged side by side in the Y-axis direction. The lenses each have an apex angle of 120 degrees, and a pitch of the lenses in the Y-axis direction is 0.1 [mm].

Further, a plurality of prisms PA are formed on the light outgoing surface 120D (the back surface) of the light-guiding plate 120. The prism PA has a gentle slope angle θ1 of 0.15 degrees, which is constant regardless of the X-axis coordinates. Furthermore, the prism PA has a steep slope angle θ2 of 70 degrees, which is constant regardless of the X-axis coordinates. The prism PA has a width LA of 0.2 [mm], which is constant regardless of the X-axis coordinates. Hence, a height HA of the prism PA is also constant regardless of the X-axis coordinates. Moreover, a thickness D of the light-guiding plate 20 is also constant regardless of the X-axis coordinates.

A plurality of prisms Q are formed on a light entering surface 140A (a back surface) of the prism sheet 140. The prism Q has a symmetric shape in the X-axis direction, and an apex angle of 68 degrees.

FIG. 18 illustrates horizontal viewing angle characteristics in the light emitting device S0. FIG. 19 illustrates horizontal viewing angle characteristics in a state where the prism sheet 140 is removed from the light emitting device S0. Characteristics WA1 and WA2 indicate viewing angle characteristics in a case where the light source 10A emits light, and characteristics WB1 and WB2 indicate viewing angle characteristics in a case where the light source 10B emits light. In the state where the prism sheet 140 is removed from the light emitting device S0, the characteristic WA1 has a peak at an observation angle around −80 degrees, and the characteristic WB2 has a peak at an observation angle around 60 degrees, as illustrated in FIG. 19. In contrast, when the prism sheet 140 is attached, the characteristics WA2 and WB2 each have a peak at an observation angle around 0 degrees. At this moment, the characteristic WB2 has a width substantially the same as a width of the characteristic WA2. In other words, a case where the plurality of light sources 10B emit light (the characteristic WB2) is substantially the same as a case where the plurality of light sources 10A emit light (the characteristic WA2), in terms of spread of light-outgoing directions.

(Light Emitting Device S1)

The light emitting device S1 corresponds to the light emitting device S0 with the exception that the light-guiding plate 120 is replaced with a light-guiding plate 220. As with the light-guiding plate 120 (FIG. 17), lenses each having a triangular cross-sectional shape in the YZ plane and extending in the X-axis direction are arranged side by side in the Y-axis direction, on a light outgoing surface 220C (a front surface) of the light-guiding plate 220. In addition, a plurality of prisms PA are formed on a light outgoing surface 220D (a back surface) of the light-guiding plate 220. The prism PA has a gentle slope angle θ1 of 0.15 degrees, which is constant regardless of the X-axis coordinates. In addition, the prism PA has a steep slope angle θ2 of 49 degrees, which is constant regardless of the X-axis coordinates. The prism PA also has a width LA of is 0.2 [mm], which constant regardless of the X-axis coordinates. Hence, a height HA of the prism PA is also constant regardless of the X-axis coordinates. In addition, a thickness D of the light-guiding plate 20 is also constant regardless of the X-axis coordinates.

FIG. 20 illustrates horizontal viewing angle characteristics in the light emitting device S1. A characteristic WA3 is a viewing angle characteristic in a case where the light source 10A emits light, and a characteristic WB3 is a viewing angle characteristic in a case where the light source 10B emits light. The characteristic WA3 is similar to that in the light emitting device S0 (FIG. 18). In contrast, in the characteristic WB3, a luminous intensity is high at observation angles around −40 degrees and around 40 degree, as compared with the light emitting device S0 (FIG. 18). In this way, in the light emitting device S1, the steep slope angle θ2 of the prism PA is set to 49 degrees, and therefore it is possible to widen the range of light-outgoing directions (decrease the directivity) in a case where the plurality of light sources 10B emit light.

(Light Emitting Device S2)

The light emitting device S2 corresponds to the light emitting device S1 with the exception that the light-guiding plate 220 is replaced with a light-guiding plate 320. As with the light-guiding plate 120 (FIG. 17), lenses each having a triangular cross-sectional shape in the YZ plane and extending in the X-axis direction are arranged side by side in the Y-axis direction, on a light outgoing surface 320C (a front surface) of the light-guiding plate 320. In addition, a plurality of prisms PA are formed on a light outgoing surface 320D (a back surface) of the light-guiding plate 320. The prism PA has a shape similar to that in the light emitting device 1 according to the present embodiment.

FIGS. 21A and 21B each illustrate distribution of luminance in the light emitting device S2 in a case where the light source 10A emits light. FIG. 21A illustrates surface distribution of luminance, and FIG. 21B illustrates distribution of luminance in the horizontal direction. FIGS. 22A and 22B each illustrate distribution of luminance in the light emitting device S2 in a case where the light source 10B emits light. FIG. 22A illustrates surface distribution of luminance, and FIG. 22B illustrates distribution of luminance in the horizontal direction. In FIGS. 21A, 21B, 22A, and 22B, a right end corresponds to a side on which the plurality of light sources 10A are disposed, whereas a left end corresponds to a side on which the plurality of light sources 10B are disposed. FIGS. 21B and 22B illustrate characteristics WA5 and WB5 of the light emitting device S1, in addition to characteristics WA4 and WB4 of the light emitting device S2.

In a case where the light source 10A emits light, the luminance distribution in the horizontal direction (the characteristic WA4) spreads in a range wider than that in the light emitting device S1 (the characteristic WA5), as illustrated in FIG. 21B. In addition, in a case where the light source 10B emits light, the luminance distribution in the horizontal direction (the characteristic WB4) is flatter than that in the light emitting device S1 (the characteristic WB5), as illustrated in FIG. 22B. In this way, in the light emitting device S2, the shape of the prism PA changes depending on the X-axis coordinates, and therefore it is possible to enhance uniformity of the luminance distribution.

(Light Emitting Device S3)

The light emitting device S3 corresponds to the light emitting device S2 with the exception that the light-guiding plate 320 is replaced with a light-guiding plate 420. As with the light-guiding plate 120 (FIG. 17), lenses each having a triangular cross-sectional shape in the YZ plane and extending in the X-axis direction are arranged side by side in the Y-axis direction, on a light outgoing surface 420C (a front surface) of the light-guiding plate 420. In addition, a plurality of prisms PA as well as a plurality of prisms PB are formed on a light outgoing surface 420D (a back surface) of the light-guiding plate 420. The prisms PA and PB each have a shape similar to that in the light emitting device 1 according to the present embodiment.

FIGS. 23A and 23B each illustrate distribution of luminance in the light emitting device S3 in a case where the light source 10A emits light. FIG. 23A illustrates surface distribution of luminance, and FIG. 23B illustrates distribution of luminance in the horizontal direction. FIGS. 24A and 24B each illustrate distribution of luminance in the light emitting device S3 in a case where the light source 10B emits light. FIG. 24A illustrates surface distribution of luminance, and FIG. 24B illustrates distribution of luminance in the horizontal direction. In FIGS. 23A, 23B, 24A, and 24B, a right end corresponds to a side on which the plurality of light sources 10A are disposed, whereas a left end corresponds to a side on which the plurality of light sources 10B are disposed. FIGS. 23B and 24B illustrate characteristics WA6 and WB6 of the light emitting device S3, and the characteristics WA4 and WB4 of the light emitting device S2.

In a case where the light source 10A emits light, the luminance distribution in the horizontal direction (the characteristic WA6) spreads in a range wider and flatter than that in the light emitting device S2 (the characteristic WA4), as illustrated in FIG. 23B. Specifically, the luminance on the side on which the plurality of light sources 10A are disposed (the right end) is greater than that in the light emitting device S2. In addition, in a case where the light source 10B emits light, the luminance distribution in the horizontal direction (the characteristic WB6) spreads in a range wider than that in the light emitting device S2 (the characteristic WB4), as illustrated in FIG. 24B. In this way, in the light emitting device S3, the prisms PB are provided and therefore it is possible to enhance the uniformity of the luminance distribution further.

FIG. 25A illustrates surface distribution of luminance in proximity to the light source 10A in a case where the light source 10A emits light. FIG. 25B illustrates surface distribution of luminance in proximity to the light source 10B in a case where the light source 10B emits light. In FIG. 25A, a right end corresponds to a side on which the plurality of light sources 10A are disposed. Similarly, in FIG. 25B, a left end corresponds to a side on which the plurality of light sources 10B are disposed. In a case where the light source 10A emits light, luminance distribution (a so-called hotspot) corresponding to each of the plurality of light sources 10A appears in proximity to the plurality of light sources 10A, as illustrated in FIG. 25A. Similarly, in a case where the light source 10B emits light, luminance distribution corresponding to each of the plurality of light sources 10B appears in proximity to the plurality of light sources 10B, as illustrated in FIG. 25B. In the light emitting device S4 to be described below, this hotspot is less noticeable.

(Light Emitting Device S4)

The light emitting device S4 corresponds to the light emitting device S3 with the exception that the light-guiding plate 420 is replaced with the light-guiding plate 20 according to the present embodiment. The light-guiding plate 20 corresponds to the light-guiding plate 420 with the exception that the light outgoing surface 420C (the front surface) has the lenticular shape (FIG. 1).

FIG. 26A illustrates surface distribution of luminance in proximity to the light source 10A in a case where the light source 10A emits light. FIG. 26B illustrates surface distribution of luminance in proximity to the light source 10B in a case where the light source 10B emits light. In FIG. 26A, a right end corresponds to a side on which the plurality of light sources 10A are disposed. Similarly, in FIG. 26B, a left end corresponds to a side on which the plurality of light sources 10B are disposed.

In a case where the light source 10A emits light, luminance distribution (a so-called hotspot) corresponding to each of the plurality of light sources 10A appears in proximity to the plurality of light sources 10A, as illustrated in FIG. 26A. Similarly, in a case where the light source 10B emits light, luminance distribution corresponding to each of the plurality of light sources 10B appears in proximity to the plurality of light sources 10B, as illustrated in FIG. 26B. A horizontal length of the hotspot is shorter than that in the light emitting device S3 (FIGS. 25A and 25B). In this way, in the light emitting device S4, the light outgoing surface 20C (the front surface) of the light-guiding plate 20 has the lenticular shape, and therefore it is possible to make the hotspot less noticeable.

FIG. 27 illustrates horizontal viewing angle characteristics in the light emitting device S4. A characteristic WA7 is a viewing angle characteristic in a case where the light source 10A emits light, and a characteristic WB7 is a viewing angle characteristic in a case where the light source 10B emits light. In this way, in the light emitting device S4, it is possible to narrow the range of light-outgoing directions (increase the directivity) in a case where the plurality of light sources 10A emit light, and to widen the range of light-outgoing directions (decrease the directivity) in a case where the plurality of light sources 10B emit light, as with the light emitting device such as the light emitting device S1 (FIG. 20). In the light emitting device S5 to be described below, the viewing angle characteristics in a case where the plurality of light sources 10B emit light are improved.

(Light Emitting Device S5)

The light emitting device S5 corresponds to the light emitting device S4 with the exception that the prism sheet 140 is replaced with the prism sheet 40 according to the present embodiment. The plurality of prisms Q each having the asymmetry shape in the X-axis direction are formed on the light entering surface 40A of the prism sheet 40, as illustrated in FIG. 10.

FIG. 28 illustrates horizontal viewing angle characteristics in the light emitting device S5. A characteristic WA8 is a viewing angle characteristic in a case where the light source 10A emits light, and a characteristic WB8 is a viewing angle characteristic in a case where the light source 10B emits light. The characteristic WA8 is similar to that in the light emitting device S4 (FIG. 27). In contrast, the characteristic WB8 has a high luminous intensity at an observation angle around −20 degrees (FIG. 27), as compared with the light emitting device S4. In this way, in the light emitting device S5, the plurality of prisms Q each having the asymmetry shape are used, and therefore it is possible to improve the viewing angle characteristics in a case where the plurality of light sources 10B emit light.

In addition, by further providing the diffusing sheet 50 in the light emitting device S5, it is possible to improve the viewing angle characteristics further as illustrated in FIG. 15.

(About Steep Slope Angle θ2)

In the light emitting device 1, the steep slope angle θ2 is 49 degrees. This allows the light emitting device 1 to widen the range of light-outgoing directions (decrease the directivity) in a case where the plurality of light sources 10B emit light, as described by way of example above using each of the light emitting devices S0 and S1 according to the respective reference examples. Viewing angle characteristics in a case where the steep slope angle θ2 is changed relative to that in the light emitting device S1 according to the reference example will be described below.

FIGS. 29A to 29F each illustrate horizontal viewing angle characteristics. FIG. 29A illustrates a case where the steep slope angle θ2 is 70 degrees (i.e., the light emitting device S0). FIG. 29B illustrates a case where the steep slope angle θ2 is 59 degrees. FIG. 29C illustrates a case where the steep slope angle θ2 is 49 degrees (i.e., the light emitting device S2). FIG. 29D illustrates a case where the steep slope angle θ2 is 39 degrees. FIG. 29E illustrates a case where the steep slope angle θ2 is 19 degrees. FIG. 29F illustrates a case where the steep slope angle θ2 is 9 degrees. Characteristics WA11 to WA16 are viewing angle characteristics in a case where the plurality of light sources 10A emit light, and characteristics WB11 the WB16 are viewing angle characteristics in a case where the plurality of light sources 10B emit light.

In the case where the steep slope angle θ2 is 70 degrees (FIG. 29A), spread of light-outgoing directions in the characteristic WB11 in a case where the plurality of light sources 10B emit light is substantially the same as that of the characteristic WA11 in a case where the plurality of light sources 10A emit light. In the case where the steep slope angle θ2 is 59 degrees (FIG. 29B), luminous intensity in the characteristic WB12 is high at observation angles around −50 degrees and around 30 degrees. At the time, the luminous intensity is high on a negative observation angles side.

In contrast, in the case where the steep slope angle θ2 is 39 degrees (FIG. 29D), the luminous intensity is high at observation angles around −40 degrees and around 40 degrees in the characteristic WB14. At the time, the luminous intensity is high on a positive observation angles side. In the case where the steep slope angle θ2 is 19 degrees (FIG. 29E), the characteristic WB15 indicates a state where a plurality of peaks appearing in the case of FIG. 29D are about to unify. In the case where the steep slope angle θ2 is 9 degrees (FIG. 29F), in the characteristic WB16, the plurality of peaks appearing in the case of FIG. 29D unify, and the range of light-outgoing directions is slightly wider than that in the characteristic WA16.

For these reasons, the steep slope angle θ2 is, for example, desirably 19 degrees or more and 59 degrees or less, and in particular, more preferably, 39 degrees or more and 59 degrees or less. This allows the light emitting device 1 to widen the range of light-outgoing directions (decrease the directivity) in a case where the plurality of light sources 10B emit light.

[Effects]

As described above, in the present embodiment, the light source section including the plurality of light sources 10A and the light source section including the plurality of light sources 10B are configured to emit light individually. It is therefore possible to change the directivity between the case where the plurality of light sources 10A emit light and the case where the plurality of light sources 10B emit light.

In the present embodiment, the steep slope angle θ2 of the prism PA is set to be around 49 degrees. It is therefore possible to widen the range of light-outgoing directions (decrease the directivity) in a case where the plurality of light sources 10B emit light.

In the present embodiment, the shape of the prism PA changes depending on the X-axis coordinates, and therefore it is possible to enhance the uniformity of the luminance distribution. Moreover, the prism PB is provided in addition to the prism PA. This makes it possible to enhance the uniformity of the luminance distribution further.

In the present embodiment, the light outgoing surface 20C (the front surface) of the light-guiding plate 20 has the lenticular shape. This makes it possible to make the hotspot less noticeable.

In the present embodiment, the prism sheet having the plurality of prisms Q each having the asymmetry shape is provided. It is therefore possible to improve the viewing angle characteristics, in a case where the plurality of light sources 10B emit light. In addition, the diffusing sheet 50 is further provided, which makes it possible to improve the viewing angle characteristics further.

[Modification Example]

In the above-described embodiment, the light outgoing surface 20C of the light-guiding plate 20 faces the prism sheet 40, and the light outgoing surface 20D faces the reflection sheet 30, but this is not limitative. Instead of this, for example, the light-guiding plate 20 may be reversed to have the light outgoing surface 20D facing the prism sheet 40 and the light outgoing surface 20C facing the reflection sheet 30, as with a light emitting device 1B illustrated in FIG. 30.

<2. Second Embodiment>

Next, a display unit 2 according to a second embodiment will be described. The display unit 2 is a liquid crystal display unit in which the light emitting device 1 is used as a backlight.

FIG. 31 illustrates a configuration example of the display unit 2 according to the second embodiment. The display unit 2 includes a liquid crystal display section 9 and the light emitting device 1. The light emitting device 1 is disposed on a back surface side of the liquid crystal display section 9.

The liquid crystal display section 9 is a transmission liquid crystal display section, and a plurality of pixels Pix not illustrated are arranged in a matrix. Further, the liquid crystal display section 9 modulates light emitted from the light emitting device 1 on the basis of a supplied image signal. An image is thereby displayed in the display unit 2.

As described in the first embodiment, the light emitting device 1 is allowed to change the directivity between the case where the plurality of light sources 10A emit light and the case where the plurality of light sources 10B emit light. This allows the display unit 2 to perform display by narrowing a viewing angle in a case where the plurality of light sources 10A emit light and to perform display by widening the viewing angle in a case where the plurality of light sources 10B emit light.

<3. Application Examples>

Next, application examples of the light emitting device described in each of the above-described embodiments and modification example will be described.

FIG. 32A illustrates an appearance of an electronic book to which the light emitting device of any of the above-described embodiments and the like is applied. FIG. 32B illustrates an appearance of another electronic book to which the light emitting device of any of the above-described embodiments and the like is applied. These electronic books each have, for example, a display section 210 and a non-display section 220. The display section 210 is configured of, for example, a liquid-crystal display panel in which the light emitting device according to any of the above-described embodiments and the like is used as a backlight.

FIG. 33 illustrates an appearance of a smartphone to which the light emitting device of any of the above-described embodiments and the like is applied. This smartphone has, for example, a display section 230 and a non-display section 240. The display section 230 is configured of, for example, a liquid-crystal display panel in which the light emitting device according to any of the above-described embodiments and the like is used as a backlight.

The light emitting device of any of the above-described embodiments and the like is applicable to electronic apparatuses in various fields. Examples of the electronic apparatuses include television apparatuses and laptop personal computers, in addition to the above-described electronic books and smartphone.

FIG. 34 illustrates an appearance of an illumination unit for indoor use, to which the light emitting device of any of the above-described embodiments and the like is applied. This illumination unit has, for example, an illumination section 844 configured of the light emitting device according to any of the above-described embodiments and the like. Any number of the illumination sections 844 are disposed at any interval on a ceiling 850A of a building. It is to be noted that it is possible to install the illumination section 844 at any position such as a wall 850B and a floor (not illustrated) depending on an intended use, without being limited to the ceiling 850A.

Such electronic apparatuses and illumination unit each perform illumination by using light from the light emitting device. It is possible to change directivity during the illumination. For example, in application to a car navigation system, it is possible to prevent a displayed image from being viewed by a driver, by narrowing the range of light-outgoing directions while driving, for example. Further, in application to an illumination unit, it is possible to use the illumination unit as an ordinary illuminator by widening the range of light-outgoing directions, and to use the illumination unit as, for example, a spotlight or an indirect illuminator by narrowing the range of light-outgoing directions. In this way, it is possible to implement various functions by applying the light emitting device of any of the above-described embodiments and the like to electronic apparatuses and illumination units.

The technology is described above using the embodiments and the modification example, as well as the application examples of application to electronic apparatus. However, the technology is not limited to these embodiments and the like, and is variously modifiable. For example, the various parameters described in the embodiments are not limitative, and any of numerical values of the respective parameters may be changed as appropriate.

In addition, for example, in the above-described embodiments, the light sources 10A and 10B are each configured using the light emitting diode, but this is not limitative. For example, the light sources may each be configured using a cold cathode fluorescent lamp (CCFL), in place of the light emitting diode.

Moreover, for example, the configuration of each of the light emitting devices is specifically described above in the embodiments and the like. However, it is not necessary to provide all components, and other component may be provided.

It is to be noted that the effects described herein are mere examples without being limitative, and other effects may also be provided.

It is to be noted that the technology may adopt the following configurations.

(1) A light emitting device including:

a first light source and a second light source;

a light-guiding plate having a first main surface, a second main surface, a first end surface, and a second end surface, the first main surface and the second main surface facing each other, the first end surface facing the first light source, the second end surface facing the first end surface and the second light source;

a prism sheet disposed to face the first main surface; and a reflection sheet disposed to face the second main surface, the light-guiding plate including a plurality of first slope sections and a plurality of second slope sections both provided on one of the first main surface and the second main surface, the plurality of first slope sections being provided to allow the light-guiding plate to be thinner in a first direction that extends from the first end surface to the second end surface, the plurality of second slope sections being provided to allow the light-guiding plate to be thicker in the first direction, and each being provided alternately with each of the first slope sections in the first direction, and a proportion of area occupied by the plurality of second slope sections increasing in a predetermined range from the second end surface, as a distance from the second end surface increases.

(2) The light emitting device according to (1), in which a level of inclination of any of the first slope sections is smaller than a level of inclination of any of the second slope sections.

(3) The light emitting device according to (1) or (2), in which the light-guiding plate includes a third slope section and a fourth slope section both provided in each of regions in which a predetermined number of first slope sections of the plurality of first slope sections are provided, the third slope section being provided to allow the light-guiding plate to be thinner in the first direction, and the fourth slope section being provided to allow the light-guiding plate to be thicker in the first direction.

(4) The light emitting device according to (3), in which a level of inclination of the third slope section is smaller than a level of inclination of the fourth slope section.

(5) The light emitting device according to (3) or (4), in which a level of inclination of the third slope section is greater than a level of inclination of the first slope section.

(6) The light emitting device according to any one of (3) to (5), in which a proportion of area, occupied by the third slope section in each of the regions in which the predetermined number of first slope sections are provided, decreases as a distance from the first end surface increases.

(7) The light emitting device according to any one of (3) to (6), in which the third slope section and the fourth slope section are provided in a predetermined range from the first end surface.

(8) The light emitting device according to any one of (1) to (7), in which an inclination angle of any of the second slope sections is in a range from 19 degrees to 59 degrees.

(9) The light emitting device according to (8), in which the inclination angle is in a range from 39 degrees to 59 degrees.

(10) The light emitting device according to any one of (1) to (9), in which the light-guiding plate further includes a lenticular lens disposed on another one of the first main surface and the second main surface which is different from the one of the first main surface and the second main surface on which the plurality of first slope sections and the plurality of second slope sections are provided.

(11) The light emitting device according to (10), in which the lenticular lens includes a plurality of lenses extending in the first direction and disposed side by side in a second direction that intersects the first direction.

(12) The light emitting device according to any one of (1) to (11), in which the prism sheet includes a plurality of prisms extending in a second direction that intersects the first direction, and disposed side by side in the first direction.

(13) The light emitting device according to (12), in which the prisms each have an asymmetry shape in the first direction.

(14) The light emitting device according to (12) or (13), in which the prisms each have a ridge, a first surface, and a second surface, the ridge extending in the second direction, the first surface and the second surface being provided with the ridge in between, an angle between the first surface and the second surface is an acute angle, and one or both of the first surface and the second surface have a changing inclination.

(15) The light emitting device according to (14), in which the first surface is a surface disposed on a side on which the first light source is provided, the second surface is a surface disposed on a side on which the second light source is provided, and the first surface has a greater change in inclination than a change in inclination of the second surface.

(16) The light emitting device according to any one of (1) to (15), in which the first light source and the second light source are allowed to emit light individually.

(17) The light emitting device according to any one of (1) to (16), in which the plurality of first slope sections and the plurality of second slope sections are provided on the first main surface.

(18) The light emitting device according to any one of (1) to (16), in which the plurality of first slope sections and the plurality of second slope sections are provided on the second main surface.

(19) A display unit with a liquid crystal display section and a light-emission section, the light-emission section being disposed on a back surface side of the liquid crystal display section, the light-emission section including:

a first light source and a second light source;

a light-guiding plate having a first main surface, a second main surface, a first end surface, and a second end surface, the first main surface and the second main surface facing each other, the first end surface facing the first light source, the second end surface facing the first end surface and the second light source;

a prism sheet disposed to face the first main surface; and a reflection sheet disposed to face the second main surface, the light-guiding plate including a plurality of first slope sections and a plurality of second slope sections both provided on one of the first main surface and the second main surface, the plurality of first slope sections being provided to allow the light-guiding plate to be thinner in a first direction that extends from the first end surface to the second end surface, the plurality of second slope sections being provided to allow the light-guiding plate to be thicker in the first direction, and each being provided alternately with each of the first slope sections in the first direction, and a proportion of area occupied by the plurality of second slope sections increasing in a predetermined range from the second end surface, as a distance from the second end surface increases.

(20) An illumination unit with a light emitting device, the light emitting device including:

a first light source and a second light source;

a light-guiding plate having a first main surface, a second main surface, a first end surface, and a second end surface, the first main surface and the second main surface facing each other, the first end surface facing the first light source, the second end surface facing the first end surface and the second light source;

a prism sheet disposed to face the first main surface; and a reflection sheet disposed to face the second main surface, the light-guiding plate including a plurality of first slope sections and a plurality of second slope sections both provided on one of the first main surface and the second main surface, the plurality of first slope sections being provided to allow the light-guiding plate to be thinner in a first direction that extends from the first end surface to the second end surface, the plurality of second slope sections being provided to allow the light-guiding plate to be thicker in the first direction, and each being provided alternately with each of the first slope sections in the first direction, and a proportion of area occupied by the plurality of second slope sections increasing in a predetermined range from the second end surface, as a distance from the second end surface increases.

The present application is based on and claims priority from Japanese Patent Application No. 2014-253646 filed with the Japan Patent Office on Dec. 16, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A light emitting device, comprising:
a first light source and a second light source;
a light-guiding plate that includes a first main surface, a second main surface, a first end surface, and a second end surface, wherein
the first main surface faces the second main surface,
the first end surface faces the first light source,
a first side of the second end surface faces the first end surface, and a second side of the second end surface faces the second light source;
a prism sheet that faces the first main surface; and
a reflection sheet that faces the second main surface, wherein
the light-guiding plate further includes a plurality of first slope sections in a first portion of the light-guiding plate and a plurality of second slope sections in a second portion of the light-guiding plate,
the plurality of first slope sections and the plurality of second slope sections are on a first one of the first main surface or the second main surface,
the first portion of the light-guiding plate is thinner than the second portion of the light-guiding plate, in a first direction that extends from the first end surface to the second end surface,
each pair of adjacent second slope portions of the plurality of second slope sections is separated by a respective first slope section of the plurality of first slope sections, in the first direction, and
the light-guiding plate further includes a third slope section in a first portion of the plurality of first slope sections and a fourth slope section in a second portion of the plurality of first slope sections.

2. The light emitting device according to claim 1, wherein a level of inclination of each of the first slope sections is smaller than a level of inclination of each of the second slope sections.

3. The light emitting device according to claim 1,
wherein the first portion of the plurality of first slope sections of the light-guiding plate is thinner than the second portion of the plurality of first slope sections of the light-guiding plate, in the first direction.

4. The light emitting device according to claim 1, wherein a level of inclination of the third slope section is smaller than a level of inclination of the fourth slope section.

5. The light emitting device according to claim 1, wherein a level of inclination of the third slope section is greater than a level of inclination of a first slope section of the plurality of first slope sections.

6. The light emitting device according to claim 1, wherein an area of the third slope section in each of the plurality of first slope sections decreases, as a distance from the first end surface increases.

7. The light emitting device according to claim 1, wherein an inclination angle of each of the plurality of second slope sections is in a range from 19 degrees to 59 degrees.

8. The light emitting device according to claim 7, wherein the inclination angle is further in a range from 39 degrees to 59 degrees.

9. The light emitting device according to claim 1, wherein the light-guiding plate further includes a lenticular lens on second one of the first main surface or the second main surface.

10. The light emitting device according to claim 9, wherein
the lenticular lens includes a plurality of lenses that extends in the first direction, and
the plurality of lenses are arranged side by side in a second direction that intersects the first direction.

11. The light emitting device according to claim 1, wherein
the prism sheet includes a plurality of prisms that extends in a second direction that intersects the first direction, and
the plurality of prisms are arranged side by side in the first direction.

12. The light emitting device according to claim 11, wherein each of the plurality of prisms comprises an asymmetry shape in the first direction.

13. The light emitting device according to claim 11, wherein
each of the plurality of prisms comprises a ridge, a first surface, and a second surface,
the ridge extends in the second direction,
the ridge is between the first surface and the second surface,
an angle between the first surface and the second surface is an acute angle, and
at least one of the first surface or the second surface have a inclination that varies.

14. The light emitting device according to claim 13, wherein
the first surface is arranged such that the first surface faces the first light source,
the second surface is arranged such that the second surface faces the second light source, and
a change in inclination of the first surface is greater than a change in inclination of the second surface.

15. The light emitting device according to claim 1, wherein at least one of the first light source or the second light source emits light.

16. The light emitting device according to claim 1, wherein the plurality of first slope sections and the plurality of second slope sections are on the first main surface.

17. The light emitting device according to claim 1, wherein the plurality of first slope sections and the plurality of second slope sections are on the second main surface.

18. A display unit, comprising:
a light emission section that comprises:
a first light source and a second light source;
a light-guiding plate that includes a first main surface, a second main surface, a first end surface, and a second end surface, wherein
the first main surface faces the second main surface,
the first end surface faces the first light source,
a first side of the second end surface faces the first end surface, and
a second side of the second end surface faces the second light source;
a prism sheet that faces the first main surface; and
a reflection sheet that faces the second main surface, wherein
the light-guiding plate further includes a plurality of first slope sections in a first portion of the light-guiding plate and a plurality of second slope sections in a second portion of the light-guiding plate,
the plurality of first slope sections and the plurality of second slope sections are on one of the first main surface or the second main surface,
the first portion of the light-guiding plate is thinner than the second portion of the light-guiding plate, in a first direction that extends from the first end surface to the second end surface,
each pair of adjacent second slope portions of the plurality of second slope sections is separated by a respective first slope section of the plurality of first slope sections, in the first direction, and
wherein the light-guiding plate further includes a third slope section in a first portion of the plurality of first slope sections and a fourth slope section in a second portion of the plurality of first slope sections.

19. An illumination unit, comprising:
a light emitting device that comprises:
- a first light source and a second light source;
- a light-guiding plate that includes a first main surface, a second main surface, a first end surface, and a second end surface, wherein
  - the first main surface faces the second main surface,
  - the first end surface faces the first light source,
  - a first side of the second end surface faces the first end surface, and
  - a second side of the second end surface faces the second light source;
- a prism sheet that faces the first main surface; and
- a reflection sheet that faces the second main surface, wherein
  - the light-guiding plate further includes a plurality of first slope sections in a first portion of the light-guiding plate and a plurality of second slope sections in a second portion of the light-guiding plate,
  - the plurality of first slope sections and the plurality of second slope sections are on one of the first main surface or the second main surface,
  - the first portion of the light-guiding plate is thinner than the second portion of the light-guiding plate, in a first direction that extends from the first end surface to the second end surface,
  - each pair of adjacent second slope portions of the plurality of second slope sections is separated by a respective first slope section of the plurality of first slope sections, in the first direction, and
  - wherein the light-guiding plate further includes a third slope section in a first portion of the plurality of first slope sections and a fourth slope section in a second portion of the plurality of first slope sections.

* * * * *